US011900865B2

United States Patent

(12) United States Patent
Kwak et al.

(10) Patent No.: US 11,900,865 B2
(45) Date of Patent: Feb. 13, 2024

(54) LIGHT EMITTING DIODE (LED) DRIVER FOR BACKLIGHT IMPROVING ACCURACY OF OUTPUT CURRENT AND INCREASING UNIFORMITY OF BRIGHTNESS BETWEEN LED CHANNELS

(71) Applicant: Samsung Electronics Co., Ltd., Suwon-si (KR)

(72) Inventors: Yongsik Kwak, Suwon-si (KR); Sunkwon Kim, Suwon-si (KR); Yongil Kwon, Suwon-si (KR); Uijong Song, Suwon-si (KR); Moonsuk Jeong, Suwon-si (KR); Youngkil Choi, Suwon-si (KR)

(73) Assignee: Samsung Electronics Co., Ltd, Gyeonggi-do (KR)

( * ) Notice: Subject to any disclaimer, the term of this patent is extended or adjusted under 35 U.S.C. 154(b) by 0 days.

(21) Appl. No.: 18/056,406

(22) Filed: Nov. 17, 2022

(65) Prior Publication Data

US 2023/0154391 A1 May 18, 2023

(30) Foreign Application Priority Data

Nov. 18, 2021 (KR) ........................ 10-2021-0159778
Jul. 29, 2022 (KR) ........................ 10-2022-0095009

(51) Int. Cl.
*G09G 3/32* (2016.01)
*G09G 3/20* (2006.01)

(52) U.S. Cl.
CPC ............. *G09G 3/32* (2013.01); *G09G 3/2007* (2013.01); *G09G 2300/0828* (2013.01); *G09G 2300/0852* (2013.01); *G09G 2310/0291* (2013.01); *G09G 2330/021* (2013.01)

(58) Field of Classification Search
CPC .......... G09G 3/30; G09G 3/32; G09G 3/3208; G09G 3/3216; G09G 3/3225; G09G 3/3233; G09G 3/3241; G09G 3/3258; G09G 3/3266; G09G 3/3275; G09G 3/3283; G09G 3/3291; G09G 2300/0828; G09G 2310/0291
USPC ...................................................... 345/76–83
See application file for complete search history.

(56) References Cited

U.S. PATENT DOCUMENTS

| | | | |
|---|---|---|---|
| 9,370,066 | B2 | 6/2016 | Han et al. |
| 10,244,591 | B2 | 3/2019 | McDonald, II et al. |
| 10,262,567 | B2 | 4/2019 | Cok et al. |
| 10,356,878 | B1 | 7/2019 | Yang et al. |

(Continued)

*Primary Examiner* — Ke Xiao
*Assistant Examiner* — Nelson Lam
(74) *Attorney, Agent, or Firm* — HARNESS, DICKEY & PIERCE, P.L.C.

(57) ABSTRACT

A light-emitting diode (LED) driving circuit for driving an LED channel including a plurality of LED elements includes a switch-capacitor amplifier circuit configured to sample received input current and amplify an input voltage corresponding to the input current, a replica circuit configured to connect to the switch-capacitor amplifier circuit in a first period to define a first feedback loop, and an output circuit configured to connect to the switch-capacitor amplifier in a second period to define a second feedback loop. The second period is after the first period, and the output circuit is configured to generate output current according to an output voltage of the switch-capacitor amplifier circuit and provide the output current to the LED.

18 Claims, 16 Drawing Sheets

(56) References Cited

U.S. PATENT DOCUMENTS

| | | | | |
|---|---|---|---|---|
| 10,764,975 | B2 | 9/2020 | Valentine | |
| 11,615,752 | B2 * | 3/2023 | Lee | G09G 5/10 345/204 |
| 2009/0189546 | A1 * | 7/2009 | Chang Chien | H05B 45/10 315/307 |
| 2011/0037396 | A1 | 2/2011 | Chien et al. | |
| 2011/0109233 | A1 | 5/2011 | Wang | |
| 2012/0120342 | A1 * | 5/2012 | Uchimoto | H05B 45/3725 349/61 |
| 2012/0293081 | A1 * | 11/2012 | Lin | H05B 45/10 315/186 |
| 2013/0278166 | A1 * | 10/2013 | Katoh | H03K 17/063 327/108 |
| 2014/0168567 | A1 * | 6/2014 | Kikuchi | H05B 45/38 349/61 |
| 2014/0340150 | A1 * | 11/2014 | Dempsey | H03F 3/45475 330/260 |
| 2016/0078821 | A1 * | 3/2016 | Lee | G09G 3/3406 345/102 |
| 2022/0353970 | A1 * | 11/2022 | Smith | H03F 3/04 |

* cited by examiner

2000

LIGHT EMITTING DIODE (LED) DRIVER FOR BACKLIGHT IMPROVING ACCURACY OF OUTPUT CURRENT AND INCREASING UNIFORMITY OF BRIGHTNESS BETWEEN LED CHANNELS

CROSS-REFERENCE TO RELATED APPLICATIONS

This application claims priority under 35 U.S.C. § 119 to Korean Patent Application No. 10-2021-0159778 filed on Nov. 18, 2021, and Korean Patent Application No. 10-2022-0095009 filed on Jul. 29, 2022, in the Korean Intellectual Property Office, the disclosures of each of which are incorporated by reference herein in their entireties.

FIELD

Some example embodiments of the inventive concepts relate to a light-emitting diode (LED) driver and/or a backlight device including the same.

BACKGROUND

Display apparatuses are widely used in smartphones, laptop computers, monitors, etc. A display apparatus may include a display panel on which an image is displayed. In this case, when the display panel is a liquid crystal display (LCD) panel rather than an organic light-emitting diode (OLED) panel including a device that emits light by itself, a backlight device for improving a contrast ratio may be provided. The backlight device may include a plurality of light-emitting diodes (LED) elements and may be located on a rear surface of the display panel.

Recently, a local dimming method of driving a plurality of LED elements according to areas of a display panel has been widely applied to backlight devices. In particular, a full-array local dimming (FALD) method of arranging LED elements in a two-dimensional (2D) array over the entire area of a display panel is receiving a lot of attention. The FALD method requires many LED elements. There is a demand for an LED driving circuit for maintaining uniform luminance with low power consumption while driving many LED elements.

SUMMARY

Some example embodiments of the inventive concepts provide a light-emitting diode (LED) driver in which the accuracy of output current provided to an LED channel is improved and various dimming control may be performed, and a backlight device including the LED driver.

According to an example embodiment of the inventive concepts, a light-emitting diode (LED) driving circuit for driving an LED channel comprising a plurality of LED elements includes a switch-capacitor amplifier circuit configured to sample received input current and amplify an input voltage corresponding to the input current, a replica circuit configured to connect to the switch-capacitor amplifier circuit in a first period to define a first feedback loop, and an output circuit configured to connect to the switch-capacitor amplifier in a second period to define a second feedback loop. The second period is after the first period, and the output circuit is configured to generate output current according to an output voltage of the switch-capacitor amplifier circuit and provide the output current to the LED.

According to another example embodiment of the inventive concepts, a light-emitting diode (LED) driving circuit for driving a backlight unit comprising a plurality of LED channels includes a current source configured to generate a reference current, and a plurality of channel driving circuits configured to sequentially sample the reference current received from the current source, and generate output current. Each of the plurality of channel driving circuits includes a switch-capacitor amplifier circuit configured to sample the reference current and amplify an input voltage corresponding to an input current, an output circuit configured to generate output current according to an output voltage of the switch-capacitor amplifier circuit in response to a dimming control signal, and provide the output current to LED elements, and a replica circuit connected to the switch-capacitor amplifier circuit to define a feedback loop when the output circuit is in an off state.

According to another example embodiment of the inventive concepts, a backlight device includes a backlight unit (BLU) comprising a plurality of dimming groups, a plurality of pixel circuits each configured to drive a corresponding one of the plurality of dimming groups, each of the plurality of pixel circuits comprising a plurality of channel driving circuits configured to provide a plurality of output currents to a plurality of light-emitting diode (LED) channels included in the corresponding one of the plurality of dimming groups, and a pixel driving circuit configured to provide a reference current to the plurality of pixel circuits. Each of the plurality of channel driving circuits includes a switch-capacitor amplifier circuit configured to sample the reference current in a first period, a replica circuit configured to define a feedback loop with the switch-capacitor amplifier in the first period, and an output circuit configured to generate at least one of the plurality of output currents according to an output voltage of the switch-capacitor amplifier circuit in a second period consecutive to the first period.

BRIEF DESCRIPTION OF THE DRAWINGS

Some example embodiments will be more clearly understood from the following detailed description taken in conjunction with the accompanying drawings in which.

DETAILED DESCRIPTION

Some example embodiments will be described in detail with reference to the accompanying drawings.

Figure 1:
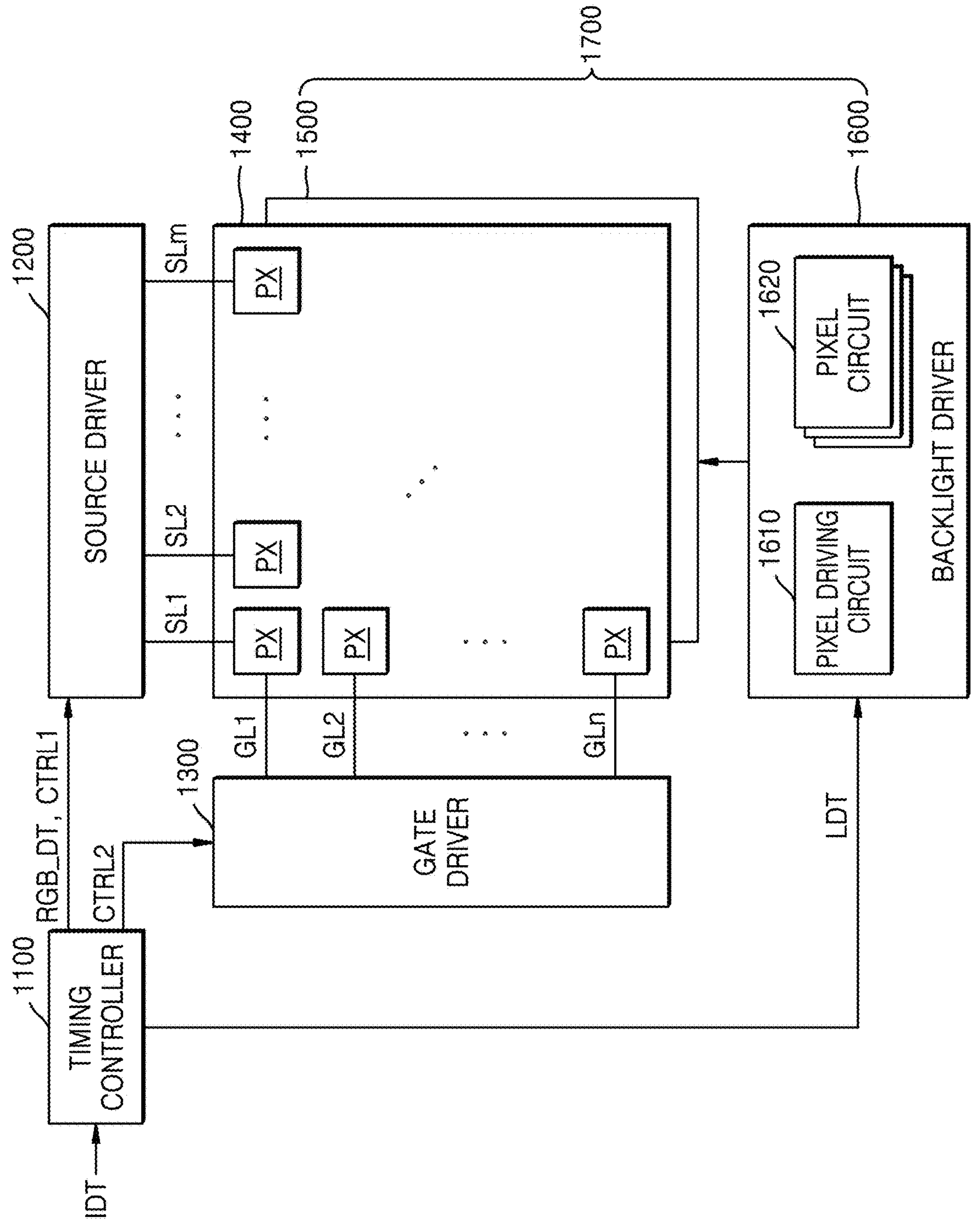
FIG. 1 is a block diagram illustrating a display apparatus, according to an example embodiment.

FIG. 1 is a block diagram illustrating a display apparatus, according to an example embodiment.

Referring to FIG. 1, a display apparatus 1000 includes a timing controller 1100, a source driver 1200, a gate driver 1300, a display panel 1400, a backlight unit 1500, and a backlight driver 1600. In some example embodiments, a configuration including the timing controller 1100, the source driver 1200, the gate driver 1300, and the backlight driver 1600 may be referred to as a display driver. In some example embodiments, a configuration including the backlight unit 1500 and the backlight driver 1600 may be referred to as a backlight device 1700. In some example embodiments, the display apparatus 1000 may further include elements such as a voltage generator (not shown) for generating various voltages required to drive the display apparatus 1000 and a memory (not shown) for storing data.

The display apparatus 1000 according to an example embodiment may be mounted on an electronic device having an image display function. Examples of the electronic device may include a smartphone, a tablet personal computer (PC), a portable multimedia player (PMP), a camera, a wearable device, a television, a digital video disk (DVD) player, a refrigerator, an air conditioner, air cleaner, a set-top box, a robot, a drone, various medical devices, a navigation device, a global positioning system (GPS) receiver, a device for a vehicle, furniture, and various measuring devices, but example embodiments are not limited thereto.

The timing controller 1100 may control the overall operation of the display apparatus 1000. For example, the timing controller 1100 may control the source driver 1200 and the gate driver 1300 so that image data IDT received from an external device is displayed on the display panel 1400.

In detail, the timing controller 1100 may generate pixel data RGB_DT by converting a format to meet an interface specification with the source driver 1200 based on the image data IDT received from the outside, and may output the pixel data RGB_DT to the source driver 1200. For example, the pixel data RGB_DT may include a red component, a blue component, and a green component of each of pixels constituting an image. Also, the timing controller 1100 may generate various control signals, e.g., first and second control signals CRTL1 and CTRL2, for controlling timings of the source driver 1200 and the gate driver 1300. The timing controller 1100 may output the first control signal CTRL1 to the source driver 1200, and may output the second control signal CTRL2 to the gate driver 1300.

Also, the timing controller 1100 may generate luminance data LDT indicating a luminance of an image based on the image data IDT, and may output the generated luminance data LDT to the backlight driver 1600. The luminance data LDT may be generated for each frame. In some example embodiments, the timing controller 1100 may reflect the generated luminance data LDT in the pixel data RGB_DT.

The source driver 1200 may convert the pixel data RGB_DT received from the timing controller 1100 into a plurality of image signals, for example, a plurality of data voltages, and may output the plurality of data voltages to the display panel 1400 through a plurality of source lines SL1 through SLm. The gate driver 1300 may be connected to a plurality of gate lines GL1 through GLn of the display panel 1400, and may sequentially drive the plurality of gate lines GL1 through GLn of the display panel 1400.

The display panel 1400 may be a display unit on which an actual image is displayed, and may be one of display apparatuses for displaying a two-dimensional (2D) image by receiving an electrically transmitted image signal, such as an organic light-emitting diode (OLED) display, a thin-film transistor-liquid crystal display (TFT-LCD), a field-emission display, or a plasma display panel (PDP). However, the inventive concepts are not limited thereto, and the display panel 1400 may be another type of flat panel display or flexible display panel. The following will be described assuming that the display panel 1400 is a thin-film transistor-liquid crystal display implemented as a device that does not emit light by itself.

The display panel 1400 may include the plurality of gate lines GL1 through GLn, the plurality of source lines SL1 through SLm arranged to intersect the plurality of gate lines GL1 through GLn, and a plurality of pixels PX arranged at intersections between the gate lines GL1 through GLn and the source lines SL1 through SLm.

The backlight unit 1500 may be located on a rear surface of the display panel 1400, and may provide additional light to improve a contrast ratio of the display panel 1400. To this end, the backlight unit 1500 may include a plurality of LED elements that emit light under the control of the backlight driver 1600. The plurality of LED elements may be divided into a plurality of dimming groups corresponding to a plurality of areas of the display panel 1400, and the numbers of LED elements included in the plurality of dimming groups may be the same or different from each other. Although each of the plurality of LED elements may be a blue LED element or a white LED element, the inventive concepts are not limited thereto, and each of the plurality of LED elements may be any of various LED elements such as a red LED element or a green LED element.

The backlight driver 1600 may drive the plurality of LED elements of the backlight unit 1500 by using a local dimming method. In detail, the backlight driver 1600 may control the plurality of LED elements so that the plurality of dimming groups of the backlight unit 1500 emit light at individual luminances. In some example embodiments, the backlight driver 1600 may control the plurality of LED elements so that the plurality of dimming groups emit light at individual luminances by using the luminance data LDT received from the timing controller 1100.

The backlight driver 1600 may include a pixel driving circuit 1610 and a plurality of pixel circuits 1620. The pixel driving circuit 1610 may provide control signals for controlling the plurality of pixel circuits 1620, for example, dimming control signals, to the plurality of pixel circuits 1620, based on the luminance data LDT. In an example embodiment, the pixel driving circuit 1610 may include a current source, and may generate reference current and may supply the reference current to the plurality of pixel circuits 1620. In an example embodiment, the pixel driving circuit 1610 may generate reference current corresponding to each of the plurality of pixel circuits 1620 or current required by each of a plurality of channel driving circuits 100 (see FIG. 3) provided in the plurality of pixel circuits 1620, and may provide the reference current to each of the channel driving circuits of the plurality of pixel circuits 1620.

The pixel circuit 1620 may drive a plurality of LED channels, and may include a plurality of channel driving circuits corresponding to the plurality of LED channels. The pixel circuit 1620 may be referred to as an LED driver. The pixel circuit 1620 may be implemented as a sample-and-hold amplifier, and may reduce or eliminate the influence of leakage current of a switch and an offset of an amplifier on output current (LED driving current) based on a replica circuit having the same or substantially the same structure as that of an output circuit. Accordingly, the accuracy of the output current may be improved, and the uniformity of brightness between LED channels may be increased.

In an example embodiment, the pixel circuit 1620 may include the current source for providing reference current to the plurality of channel driving circuits, and the current source may provide reference current corresponding to the plurality of channel driving circuits in a time-division manner. In an example embodiment, the current source may be implemented as a digital-to-analog converter, and may generate reference current corresponding to each of the plurality of channel driving circuits based on a current control value for each of the channel driving circuits. Because the plurality of channel driving circuits share the current source, power consumption may be reduced, and because the current source provides reference current corresponding to each of the channel driving circuits and the channel driving circuit generates output current provided to an LED channel based on the reference current and adjusts a time when the output current is provided, that is, an emission time of the LED channel, dimming control of a pulse amplitude modulation (PAM) method and a pulse width modulation (PWM) method may be performed for each channel.

Figure 2:
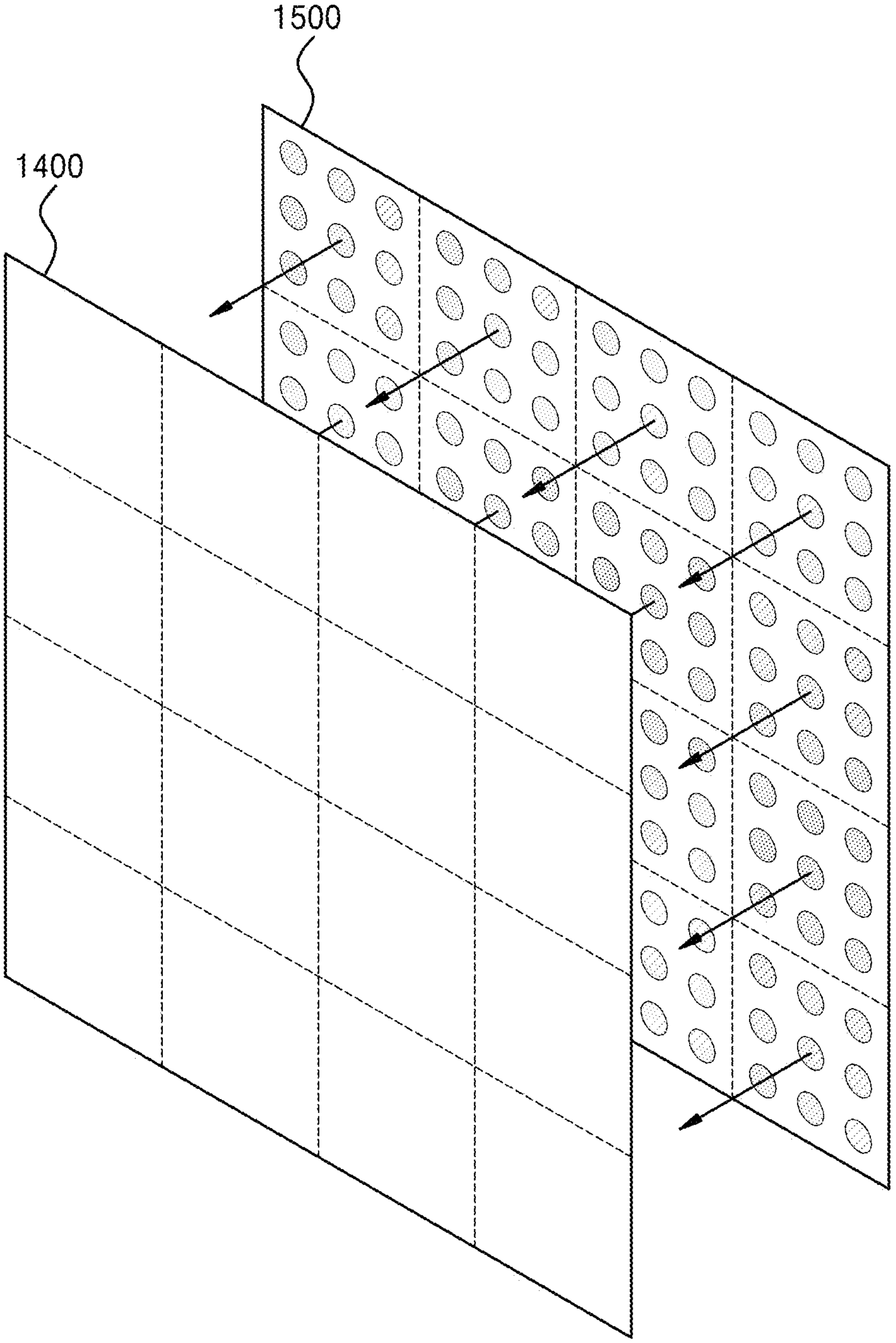
FIG. 2 is a diagram illustrating a display panel and a backlight unit, according to an example embodiment.

FIG. 2 is a diagram illustrating a display panel and a backlight unit, according to an example embodiment. In detail, FIG. 2 illustrates the display panel 1400 and the backlight unit 1500 of FIG. 1.

The display panel 1400 may be divided into a plurality of areas arranged in an m×n array (e.g., m and n are positive integers), and the backlight unit 1500 may also be divided into a plurality of dimming groups arranged in an m×n array respectively corresponding to the plurality of areas. For example, referring to FIG. 2, the display panel 1400 may be divided into a plurality of areas arranged in a 4×4 array, and the backlight unit 1500 may be divided into a plurality of dimming groups arranged in a 4×4 array. In other words, the display panel 1400 may be divided into a first area through a $16^{th}$ area, and the backlight unit 1500 may be divided into a first dimming group through a $16^{th}$ dimming group respectively corresponding to the first area through the $16^{th}$ area. The m×n arrangement of the plurality of dimming groups is merely an example and the inventive concepts are not limited thereto, and various m×n arrangements may be applied.

The backlight driver 1600 may check a luminance of an image displayed in each of the plurality of areas of the display panel 1400 based on the received luminance data LDT. The backlight driver 1600 may drive the backlight unit 1500 for each dimming group to emit light with brightness corresponding to a luminance of each of the plurality of areas. The luminance data LDT may include a plurality of levels indicating a luminance level of an image.

For example, the backlight unit 1600 may determine a luminance of an image displayed in the first area of the display panel 1400 based on the luminance data LDT, and may control LED elements included in the first dimming group of the backlight unit 1500 to emit light with brightness corresponding to the determined luminance.

Although the backlight driver 1600 receives the luminance data LDT and drives the backlight unit 1500 by using the received luminance data LDT in FIGS. 1 and 2, the inventive concepts are not limited thereto. For example, the backlight unit 1600 may receive the image data IDT or the pixel data RGB_DT from the timing controller 1100, may calculate a luminance of each of the plurality of areas of the display panel 1400 by using the received image data IDT or the received pixel data RGB_DT, and may drive the backlight unit 1500 based on the calculated luminance.

Figure 3:
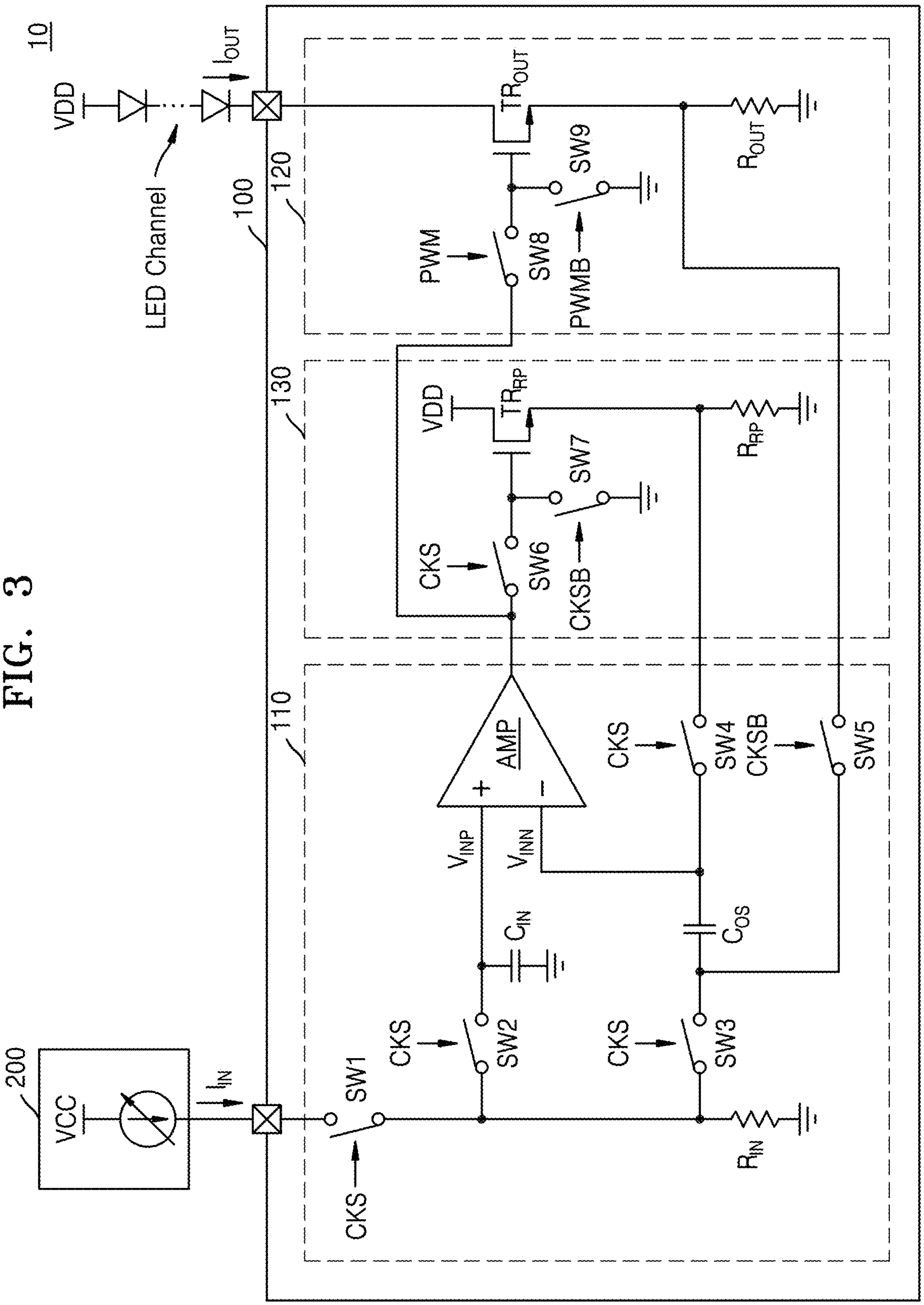
FIG. 3 is a circuit diagram illustrating a light-emitting diode (LED) driving circuit, according to an example embodiment.
Figure 4:
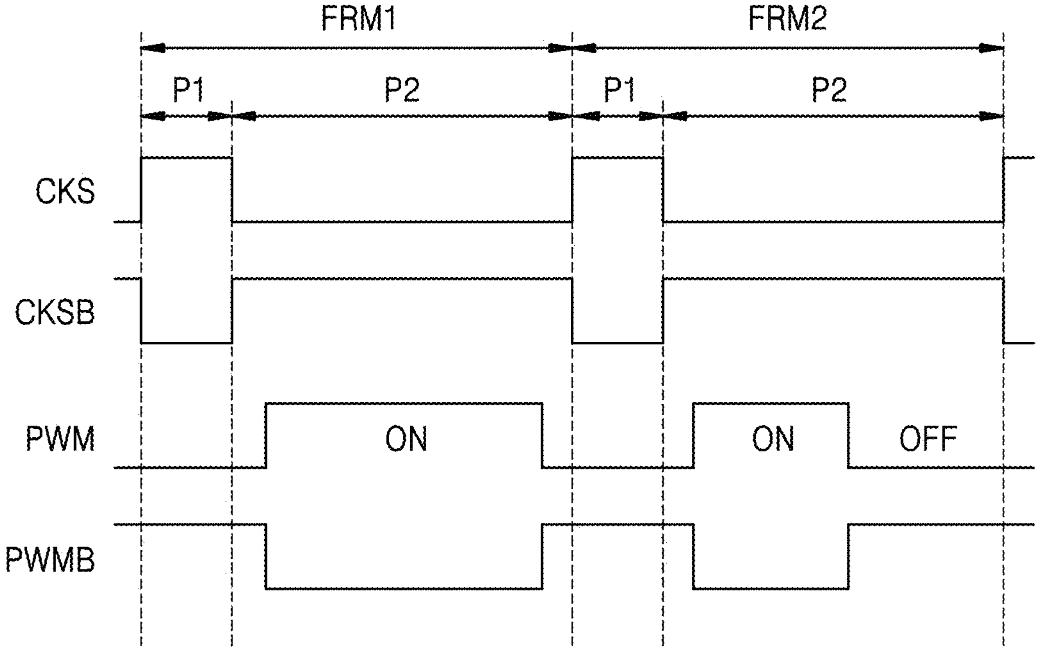
FIG. 4 is a timing diagram illustrating the LED driving circuit of FIG. 3.

FIG. 3 is a circuit diagram illustrating an LED driving circuit, according to an example embodiment. FIG. 4 is a timing diagram illustrating the LED driving circuit of FIG. 3. For convenience of explanation, an LED channel including a plurality of LED elements is also illustrated.

Referring to FIG. 3, an LED driving circuit 10 may include the channel driving circuit 100 and a current source 200, and the channel driving circuit 100 may include a switch-capacitor amplifier circuit 110, an output circuit 120, and a replica circuit 130. In an example embodiment, each of the channel driving circuit 100 and the current source 200 may be implemented as one semiconductor chip. For example, the channel driving circuit 100 may be integrated into the pixel circuit 1620 (e.g., see FIG. 1), and the current source 200 may be integrated into the pixel driving circuit 1610. In an example embodiment, the channel driving circuit 100 and the current source 200 may be integrated into the pixel circuit 1620.

The current source 200 may generate reference current, and may provide the reference current as input current $I_{IN}$ to the channel driving circuit 100. Although one channel driving circuit 100 is illustrated in FIG. 3, the LED driving circuit 10 may include a plurality of channel driving circuits 100, and the current source 200 may generate a plurality of reference currents $I_{IN}$ corresponding to the plurality of channel driving circuits 100 in a time-division manner, and may respectively provide the plurality of reference currents $I_{IN}$ to the plurality of channel driving circuits 100.

The channel driving circuit 100 may be implemented as a sample-and-hold amplifier circuit. The switch-capacitor amplifier circuit 110 samples input current $I_{IN}$ and outputs a sampled voltage corresponding to the input current $I_{IN}$, and the output circuit 120 generates output current $I_{OUT}$ corresponding to the voltage output from the switch-capacitor amplifier circuit 110. The replica circuit 130 may have the same or substantially the same structure as that of the output circuit 120, and may be used to compensate for an offset voltage of the switch-capacitor amplifier circuit 110.

The switch-capacitor amplifier circuit 110 may include a first resistor $R_{IN}$, switches SW1, SW2, SW3, SW4, and SW5, sampling and offset capacitors $C_{IN}$ and $C_{OS}$, and an amplifier AMP. The switches SW1, SW2, SW3, SW4, and SW5 may be implemented as transistors (e.g., metal-oxide-semiconductor field-effect transistors (MOSFETs)). The switches SW1, SW2, SW3, SW4, and SW5 may be turned on and turned off in response to a sampling control signal (hereinafter, referred to as a CKS signal) and a sampling control bar signal (hereinafter, referred to as a CKSB signal). The CKSB signal is a complementary signal of the CKS signal, and the CKSB signal and the CKS signal have opposite phases. In an example embodiment, a capacitance of the sampling capacitor $C_{IN}$ and a capacitance of the offset capacitor $C_{OS}$ may be the same or substantially the same.

The output circuit 120 may include switches SW8 and SW9, a first transistor $TR_{OUT}$, and a second resistor $R_{OUT}$. The switch SW8 may be turned on and turned off in response to a dimming control signal (hereinafter, referred to as a PWM signal), and the switch SW9 may be turned on and turned off in response to a dimming control bar signal (hereinafter, referred to as a PWMB signal). The PWMB signal is a complementary signal of the PWM signal, and the PWMB signal and the PWM signal have opposite phases. Accordingly, when the switch SW8 is turned on, the switch SW9 may be turned off, and when the switch SW8 is turned off, the switch SW9 may be turned on.

When a capacitance of the input capacitor $C_{IN}$ and a capacitance of the offset capacitor $C_{OS}$ are the same or substantially the same, the replica circuit 130 may include switches SW6 and SW7, a second transistor $TR_{RP}$, and a third resistor $R_{RP}$. The switch SW6 may be turned on and turned off in response to the CKS signal, and the switch SW7 may be turned on and turned off in response to the CKSB signal. In an example embodiment, a resistance value of the third resistor $R_{RP}$ may be the same or substantially the same as a resistance value of the first resistor $R_{IN}$. In an example embodiment, a ratio between a size of the second transistor $TR_{RP}$ and a size of the first transistor $TR_{OUT}$ may be the same or substantially the same as a ratio between a resistance value of the second resistor $R_{OUT}$ and a resistance value of the first resistor $R_{IN}$.

Referring to FIGS. 3 and 4 together, the channel driving circuit 100 may operate in units of frames, and each frame may include a first period P1 and a second period P2. In the first period P1, the CKS signal has an active level, for example, a logic high level, and in the second period P2, the CKS signal may have an inactive level, for example, a logic low level. In the second period P2, the PWM signal may have an active level, and a period for which the PWM signal has an active level may vary according to a luminance value set for an LED channel.

The first period P1 may be referred to as an input sampling period. When the CKS signal has an active level in the first period P1, the switches SW1, SW2, SW3, SW4, and SW6 may be turned on, and the switch-capacitor amplifier circuit 110 and the replica circuit 130 are connected to each other. In some example embodiments, the switch SW8 may be turned off in response to the PWM signal having an inactive level, for example, a logic low level, and the switch SW5 may be turned off in response to the CKSB signal having an inactive level. Accordingly, the output circuit 120 is in an off state, and the output current $I_{OUT}$ does not flow through the LED channel.

The input current $I_{IN}$ flows through the first resistor $R_{IN}$, and the first resistor RN converts the input current $I_{IN}$ into a corresponding input voltage. An end of the sampling capacitor $C_{IN}$ is connected to an end of the first resistor $R_{IN}$ and an end a first input end (+) of the amplifier AMP. The input voltage may be stored in the sampling capacitor $C_{IN}$, and may be provided to the first end (+) of the amplifier AMP.

The amplifier AMP and the second transistor $TR_{RP}$ may form a voltage follower. The second transistor $TR_{RP}$ may generate current (e.g., replica current) based on an output voltage of the amplifier AMP, and the current may flow through the third resistor $R_{RP}$.

The amplifier AMP and the second transistor $TR_{RP}$ may form a negative feedback loop. A voltage corresponding to the output voltage of the amplifier AMP may be provided to a second input end (−) of the amplifier AMP. An end of the offset capacitor $C_{OS}$ may be connected to an end of the first resistor $R_{IN}$, and the other end of the offset capacitor $C_{OS}$ may be connected to the second input end (−) of the amplifier AMP. Ideally or preferably, a first input voltage VINP applied to the first input end (+) of the amplifier AMP and a second input voltage $V_{INN}$ applied to the second input end (−) of the amplifier AMP may be the same or substantially the same. However, there may be a voltage difference between the first input voltage VINP and the second input voltage $V_{INN}$ due to an offset of the amplifier AMP, and such an offset voltage may be stored in the offset capacitor $C_{OS}$.

The second period P2 may be referred to as a dimming period. When the CKS signal has an inactive level in the second period P2, the switches SW1, SW2, SW3, SW4, and SW6 may be turned off, and the replica circuit 130 may be in an off state. The switch SW5 may be turned on in response to the CKSB signal having an active level, and the switch-capacitor amplifier circuit 110 and the output circuit 120 may be connected to each other.

The switch-capacitor amplifier circuit 110 may hold an input voltage corresponding to the sampled input signal $I_{IN}$ in the second period P2, and may output a voltage corresponding to the input voltage. The output circuit 120 may drive the LED channel, by generating the output current $I_{OUT}$ corresponding to the output voltage of the switch-capacitor amplifier circuit 110 based on the PWM signal.

The switch SW8 may be turned on in response to the PWM signal having an active level, and the output voltage of the switch-capacitor amplifier circuit 110 may be applied to the first transistor $TR_{OUT}$. The first transistor $TR_{OUT}$ may generate the output current $I_{OUT}$ corresponding to the applied voltage. A luminance of the LED channel may be adjusted by controlling a time for which the first transistor $TR_{OUT}$ generates the output current $I_{OUT}$ in the second period P2 based on the PWM signal.

The amplifier AMP, the first transistor $TR_{OUT}$, and the offset capacitor $C_{OS}$ may form a negative feedback loop. The first transistor $TR_{OUT}$ may generate a voltage corresponding to the output voltage of the amplifier AMP, and may provide the voltage to the second input end (−) of the amplifier AMP through the offset capacitor $C_{OS}$.

In some example embodiments, the influence of an offset voltage generated due to an offset of the amplifier AMP on the output voltage of the amplifier AMP may be offset by the offset voltage stored in the offset capacitor $C_{OS}$ in the first period P1. Accordingly, the offset of the amplifier AMP does not affect the output current $I_{OUT}$. A relationship between the input current $I_{IN}$ and the output current $I_{OUT}$ may be determined by a ratio between the first resistor $R_{IN}$ and the second resistor $R_{OUT}$, and may be expressed as shown in Equation 1.

$$I_{OUT} = I_{IN} \cdot \frac{R_{IN}}{R_{OUT}} \quad \text{[Equation 1]}$$

As shown in FIG. 4, a PWM signal may vary for each frame. For example, when luminances set for the LED channel in a first frame PWM1 and a second frame PWM2 are different from each other, a period in which the PWM signal has an active level in the first frame PWM1 and a period in which the PWM signal has an active level in the second frame PWM2 may be different from each other. A time for which the output current $I_{OUT}$ flows through the LED channel, for example, a timing time, may be adjusted by varying the PWM signal according to a luminance set to the LED channel for each frame. The LED channel may output an optical signal having a luminance according to the dimming time and intensity of the output current $I_{OUT}$.

As described above, the channel driving circuit 100 according to an embodiment may drive the LED channel because the switch-capacitor amplifier circuit 110 and the replica circuit 130 sample the input current $I_{IN}$ in the first period P1, the switch-capacitor amplifier circuit 110 holds an input voltage corresponding to the input current $I_{IN}$ in the second period P2, and the output circuit 120 generates the output current $I_{OUT}$ corresponding to an output voltage of the switch-capacitor amplifier circuit 110 based on the PWM signal.

Because the replica circuit 130 stores an offset voltage according to an offset of the amplifier AMP in the offset voltage $C_{OS}$ in the first period P1, and an offset of the amplifier AMP is removed based on the offset voltage stored in the offset capacitor $C_{OS}$ in the second period P2, the influence of an offset of the amplifier AMP on the output current $I_{OUT}$ may be reduced or eliminated, which will be described in detail with reference to FIGS. 5A and 5B.

Figure 5A:
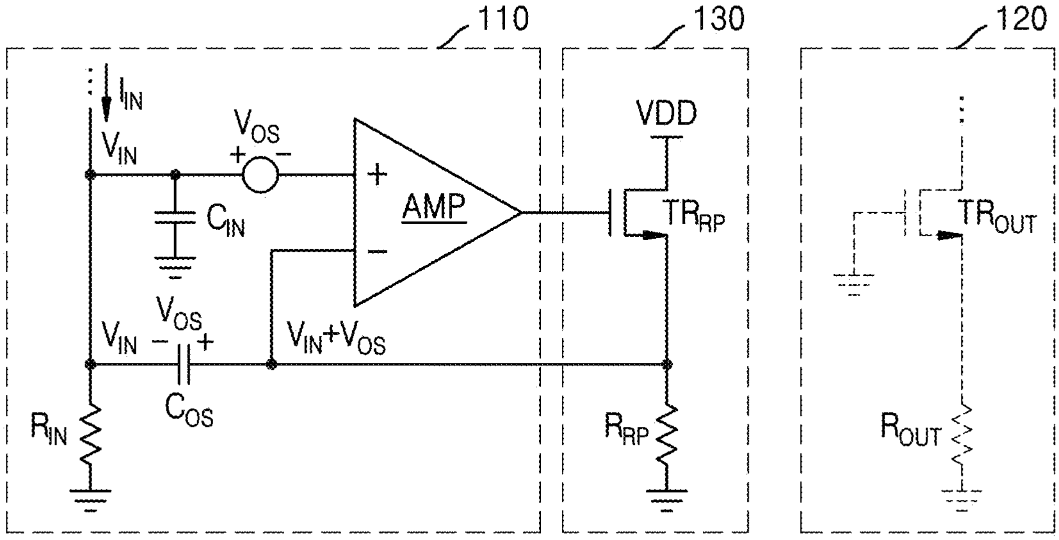
FIG. 5A illustrates an operation of CKS phase of an LED driving circuit, according to an example embodiment.

FIG. 5A illustrates an input signal sampling operation of an LED driving circuit, according to an example embodiment. FIG. 5B illustrates an output current generation operation of an LED driving circuit, according to an example embodiment.

Figure 5B:
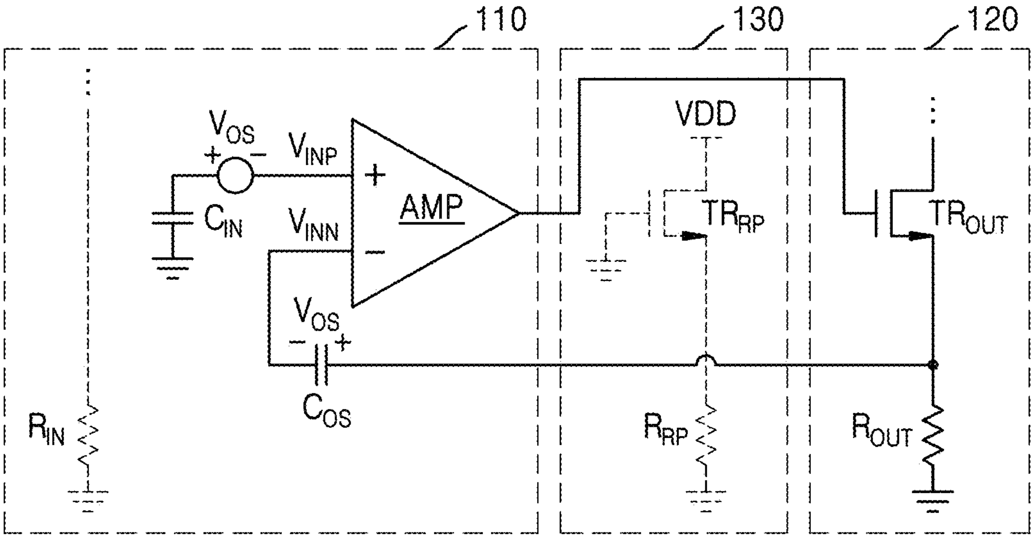
FIG. 5B illustrates an operation of a pulse width modulation (PWM) phase of an LED driving circuit, according to an example embodiment.

Referring to FIGS. 5A and 5B, the channel driving circuit 100 may operate for each phase. As described with reference to FIG. 4, in the first period P1, the channel driving circuit 100 may sample an input signal, and the replica circuit 130 may be connected to the switch-capacitor amplifier circuit 110 to sample the input current $I_{IN}$. In the second period P2, the channel driving circuit 100 may generate output current. The output circuit 120 may be connected to the switch-capacitor amplifier circuit 110 to generate the output current $I_{OUT}$ corresponding to the sampled input current $I_{IN}$ based on the PWM signal. The following will be described assuming that an offset voltage $V_{OS}$ according to an offset of the amplifier AMP is applied to the first input end (+) of the amplifier AMP.

Referring to FIG. 5A, in the first period, an input voltage $V_{IN}$ generated corresponding to the input current $I_{IN}$ is stored in the sampling capacitor $C_{IN}$, and the input voltage $V_{IN}$ is transmitted to the offset capacitor $C_{OS}$ connected to the second input end (−) of the amplifier AMP, through the switch-capacitor amplifier circuit 110 and the replica circuit 130. In some example embodiments, a voltage obtained by adding the offset voltage $V_{OS}$ to the input voltage $V_{IN}$ is applied to the second input end (−) of the amplifier AMP due to a negative feedback loop formed by the amplifier AMP and the second transistor $TR_{RP}$. An end of the offset capacitor $C_{OS}$ is connected to an end of the input resistor $R_{IN}$ and the other end of the offset capacitor $C_{OS}$ is connected to the second input end (−) of the amplifier AMP, so that a voltage between both ends of the offset capacitor $C_{OS}$ becomes the offset voltage $V_{OS}$. In other words, the offset voltage $V_{OS}$ is stored in the offset capacitor $C_{OS}$. Because the output circuit 120 is in an off state, the output current $I_{OUT}$ does not flow through an LED channel.

Referring to FIG. 5B, in the second period consecutive to the first period, the replica circuit 130 is in an off state, and an end of the offset capacitor $C_{OS}$ is connected to the output resistor $R_{OUT}$. The input capacitor $C_{IN}$ holds the input voltage $V_{IN}$ sampled for the first period, and a voltage obtained by adding the offset voltage $V_{OS}$ to the input voltage $V_{IN}$ is applied to the second input end (−) of the amplifier AMP due to a negative feedback loop formed by the amplifier AMP and the first transistor $TR_{OUT}$. Because the offset voltage $V_{OS}$ stored for the first period is applied to both ends of the offset capacitor $C_{OS}$, an output voltage VOUT of an end of the second resistor $R_{OUT}$ may be as shown in Equation 2.

$$V_{OUT} = V_{IN} + V_{OS} - V_{OS} = V_{IN} \quad \text{[Equation 2]}$$

Accordingly, in the output current $I_{OUT}$, a component due to an offset of the amplifier AMP may be removed as shown in Equation 3. The output current $I_{OUT}$ may be determined by the input current $I_{IN}$ and a ratio between the first resistor $R_{IN}$ and the second resistor $R_{OUT}$.

$$I_{OUT} = \frac{V_{OUT}}{R_{OUT}} = \frac{V_{IN}}{R_{OUT}} = I_{IN} \cdot \frac{R_{IN}}{R_{OUT}} \quad \text{[Equation 3]}$$

As such, in the channel driving circuit 100 including the replica circuit 130 having the same structure as that of the output circuit 120, because an offset component of the amplifier AMP is removed from the output current $I_{OUT}$, the accuracy of the output current $I_{OUT}$ may be improved. The accuracy of the output current $I_{OUT}$ refers to how close actual output current is to target output current. Assuming that a multi-channel driving circuit for driving a plurality of LED channels is implemented based on the channel driving circuit 100, even when amplifiers of channels have different offsets, because the offsets do not affect output current, mismatch between channels may be removed.

Figure 6:
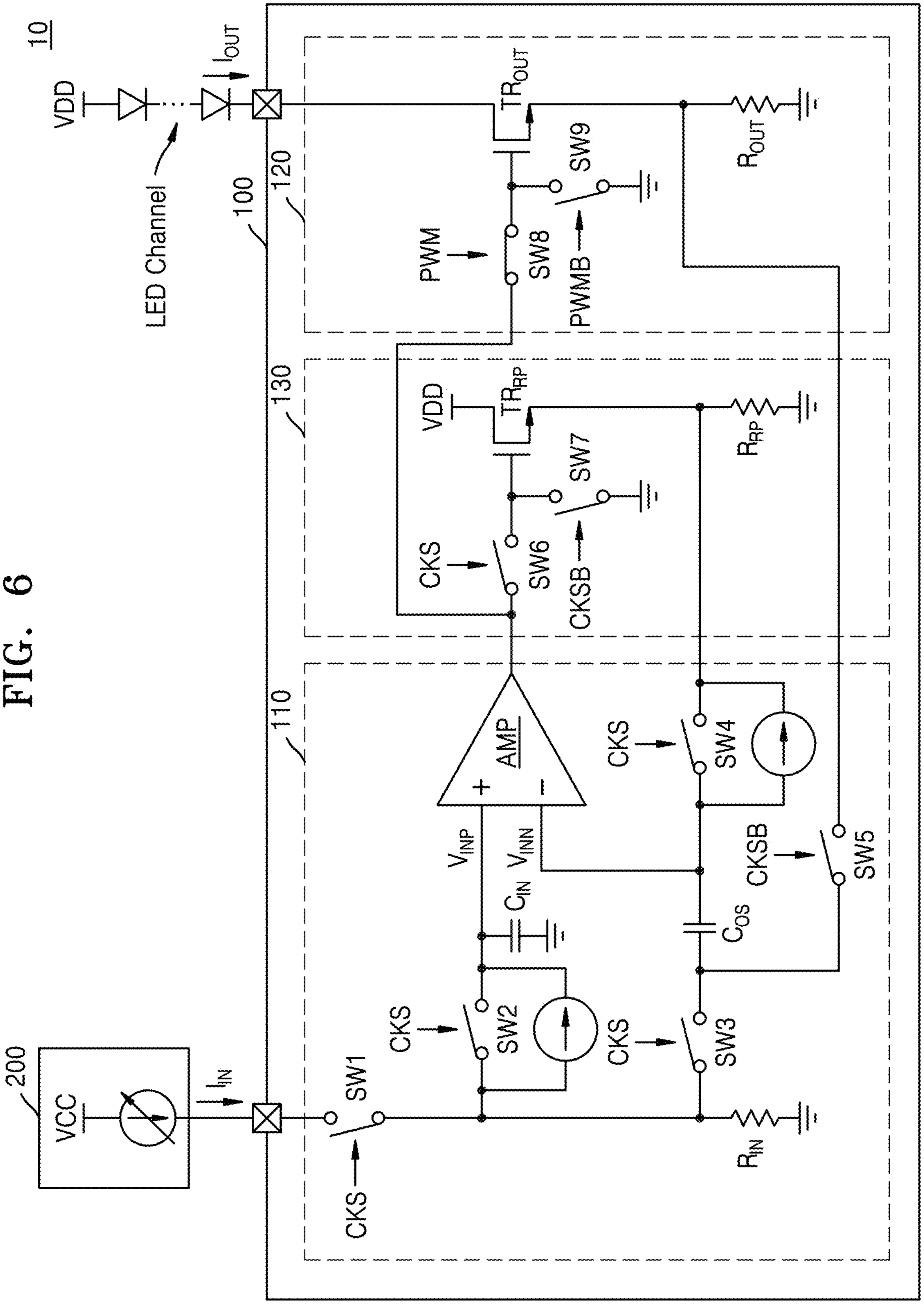
FIG. 6 is a diagram illustrating leakage current in an LED driving circuit, according to an example embodiment.

FIG. 6 is a diagram illustrating leakage current in an LED driving circuit, according to an example embodiment. For convenience of explanation, leakage currents $I_{LEAK1}$ and $I_{LEAK2}$ were modeled for the switches SW2 and SW4 connected to both input ends (+) and (−) of the amplifier AMP.

Referring to FIG. 6, in the second period after a sampling operation is performed for the first period, the switches SW1, SW2, SW3, SW4, and SW6 switched in response to the CKS signal may be turned off, and leakage current may be generated in the switches SW1, SW2, SW3, SW4, and SW6.

Due to the leakage currents $I_{LEAK1}$ and $I_{LEAK2}$ generated in the switches SW2 and SW4 connected to both ends of the amplifier AMP, voltages of the first input end (+) and the second input end (−) of the amplifier AMP may be changed over time. In some example embodiments, when voltage change amounts are respectively ΔVIN+ and ΔVIN−, the values may be expressed as shown in Equation 4.

$$\Delta V_{IN+} = \frac{I_{LEAK1}}{C_{IN}} \cdot \Delta t,\ \Delta V_{IN-} = \frac{I_{LEAK2}}{C_{OS}} \cdot \Delta t \quad \text{[Equation 4]}$$

The leakage currents $I_{LEAK1}$ and $I_{LEAK2}$ of the two switches SW2 and SW4 may be determined by a voltage applied to the switches SW2 and SW4 and sizes of transistors implemented by the switches SW2 and SW4. Because the amplifier AMP and the output circuit 120 form a negative feedback loop, the same voltage is applied to the switches SW2 and SW4 connected to both input ends (+) and (−) of the amplifier AMP. When the switch SW2 and the switch SW4 are implemented as transistors having the same or substantially the same size, the two leakage currents $I_{LEAK1}$ and $I_{LEAK2}$ may have the same value. Here, when a capacitance of the input capacitor $C_{IN}$ and a capacitance of the offset capacitor $C_{OS}$ are the same, the voltage change amount ΔVIN+ of the first input end (+) of the amplifier AMP and the voltage change amount ΔVIN− of the second input end (+) are the same or substantially the same. Accordingly, even when voltages of the two input ends (+) and (−) of the amplifier AMP are changed over time, a voltage difference between the two input ends (+) and (−) may be maintained at a constant or substantially constant value. Accordingly, an output voltage of the amplifier AMP may not be changed, and even when time elapses, the output circuit 120 may maintain the output current $I_{OUT}$ at a constant or substantially constant level.

As described above, in the channel driving circuit 100 according to an example embodiment, because a voltage difference between both ends of the amplifier AMP may be maintained constant or substantially constant even when leakage current is generated and a capacitance of a capacitor is changed due to a manufacturing process and a temperature, the output current $I_{OUT}$ is not affected by the leakage current.

Because the channel driving circuit 100 removes an error value due to leakage current of a switch, the accuracy of driving current of an LED channel, that is, the output current $I_{OUT}$ of the output circuit 120, may be improved.

Figure 7:
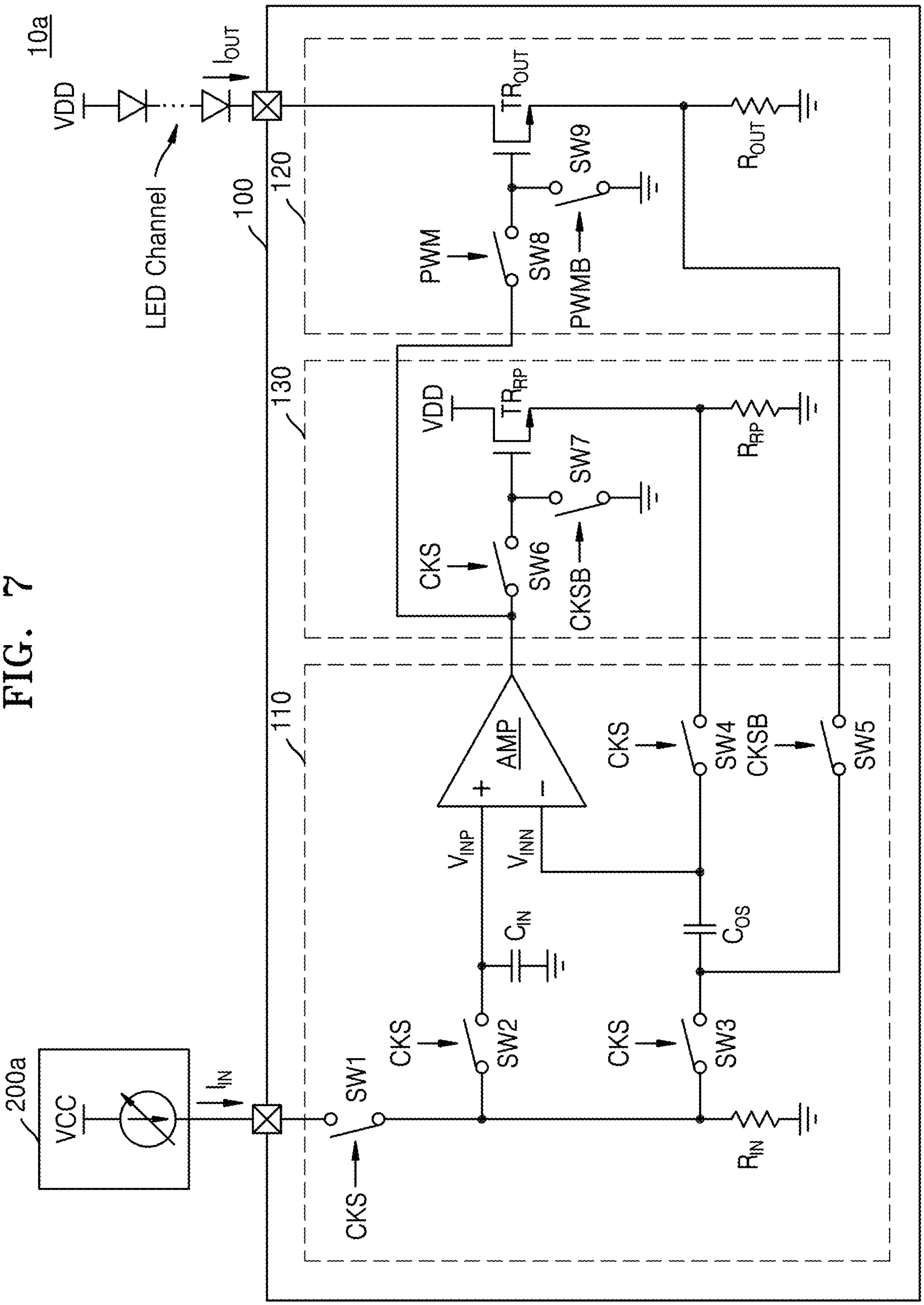
FIG. 7 illustrates an LED driving circuit, according to an example embodiment.

FIG. 7 illustrates an LED driving circuit, according to an example embodiment.

Referring to FIG. 7, an LED driver 10*a* may include a current source 200*a* and the channel driving circuit 100. In an example embodiment, each of the channel driving circuit 100 and the current source 200*a* may be implemented as one semiconductor chip. For example, the channel driving circuit 100 may be integrated into the pixel circuit 1620 (e.g., see FIG. 1), and the current source 200*a* may be integrated into the pixel driving circuit 1610. In an example embodiment, the channel driving circuit 100 and the current source 200*a* may be integrated into the pixel circuit 1620.

In some example embodiments, the current source 200*a* may include a digital-to-analog converter DAC, and the digital-to-analog converter DAC may generate reference current having a current value according to a current control signal PAM. The reference current may be provided as the input current $I_{IN}$ to the channel driving circuit 100. The current control signal PAM may vary according to a luminance set for an LED channel driven by the channel driver 100.

The current control signal PAM may include a plurality of digital bits, and the digital-to-analog converter DAC may generate reference current having a current value according to a value indicated by the plurality of digital bits of the current control signal PAM. For example, the digital-to-analog converter DAC may generate reference current having a higher current value as a higher value is indicated by the current control signal PAM.

As described with reference to Equation 3, the output current $I_{OUT}$ may be determined based on the input current $I_{IN}$, and a luminance of an LED driving channel may be determined based on an intensity of the output current $I_{OUT}$ and a time for which the output current $I_{OUT}$ is provided to the LED driving channel. Accordingly, a luminance of the LED driving channel may be determined according to an intensity of the reference current provided as the input current $I_{IN}$.

As such, the LED driver 10*a* may control a luminance of the LED channel by using not only a pulse width modulation (PWM) method but also a pulse amplitude modulation (PAM) method.

Figure 8:
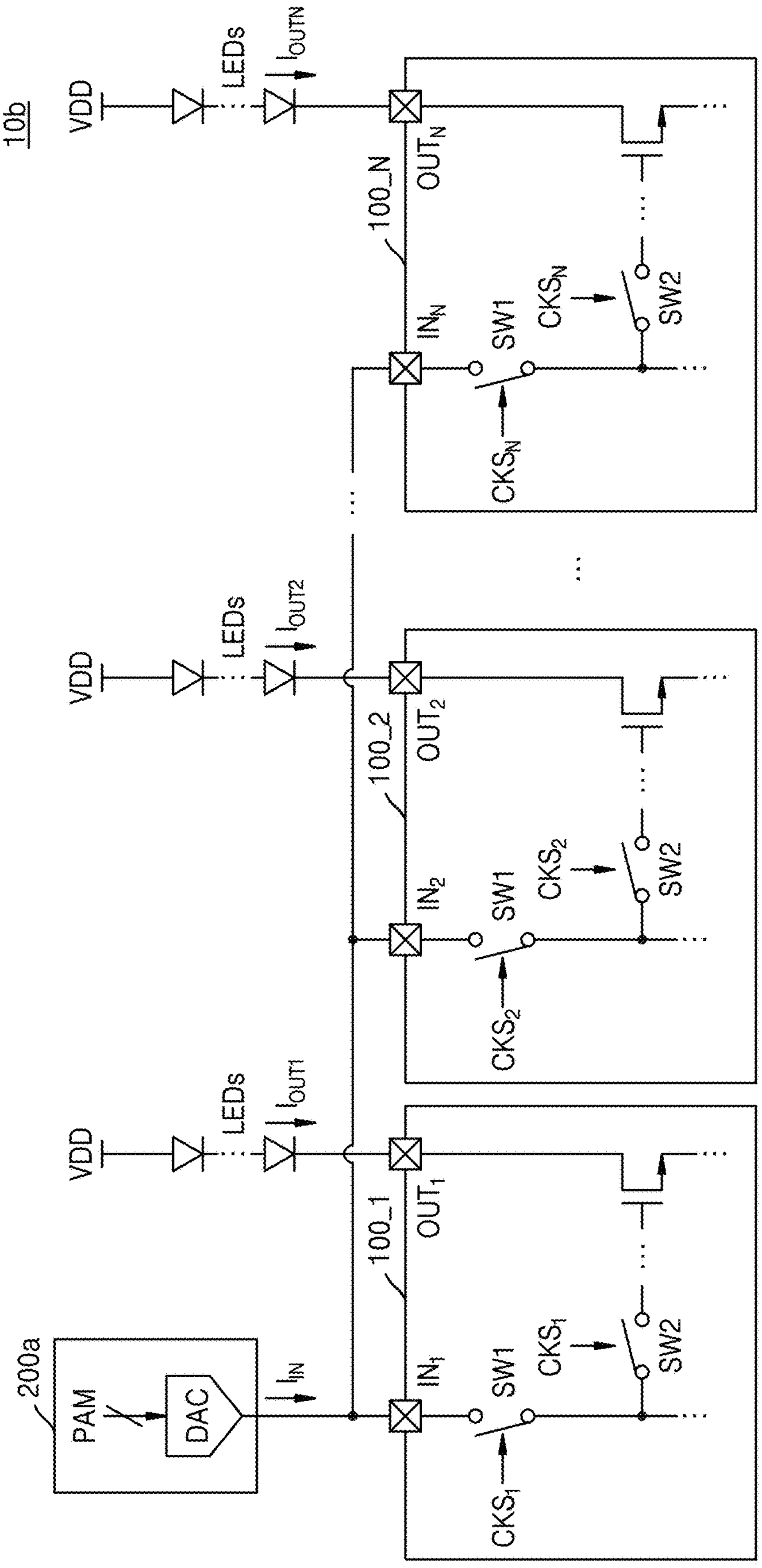
FIG. 8 illustrates an LED driving circuit, according to an example embodiment.
Figure 9:
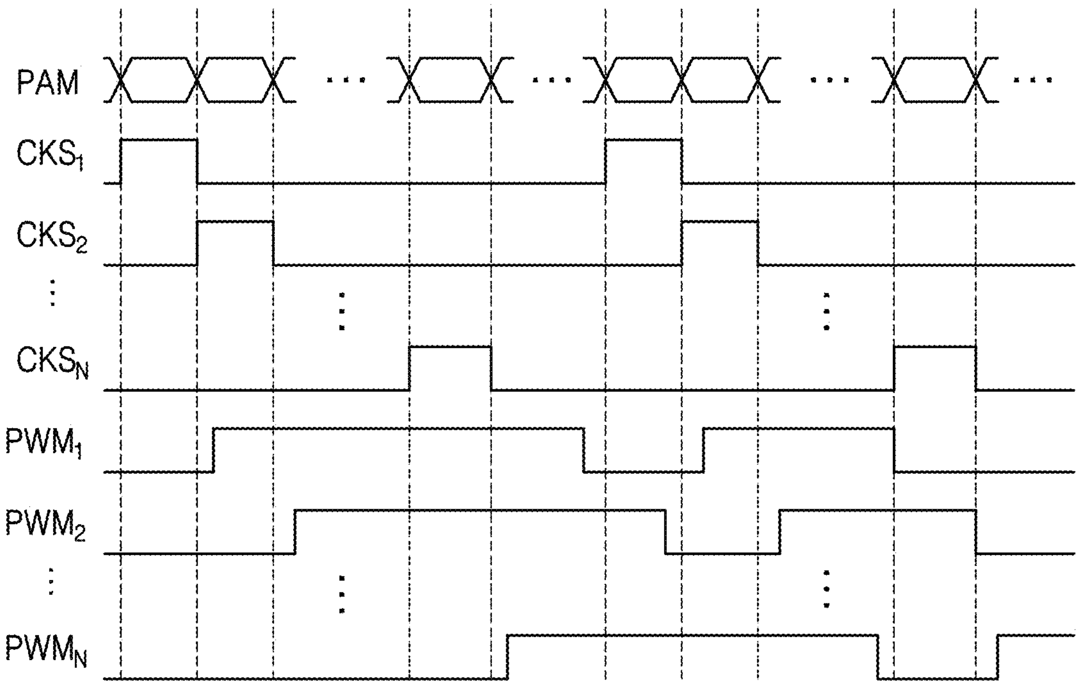
FIG. 9 is a timing diagram illustrating the LED driving circuit of FIG. 8.

FIG. 8 illustrates an LED driving circuit, according to an example embodiment. FIG. 9 is a timing diagram illustrating the LED driving circuit of FIG. 8.

Referring to FIG. 8, an LED driver 10*b* may include the current source 200*a* and a plurality of channel driving circuits 100_1, 100_2, . . . , and 100_N (e.g., where N is a positive integer equal to or greater than 2). When it is assumed that the LED driver 10*b* drives N LED channels, the LED driver 10*b* may include N channel driving circuits 100_1, 100_2, . . . , and 100_N for respectively driving the N LED channels. In an example embodiment, the plurality of channel driving circuits 100_1, 100_2, . . . , and 100_N may be implemented as one semiconductor chip, and the current source 200*a* may be implemented as another semiconductor chip. For example, the plurality of channel driving circuits 100_1, 100_2, . . . , and 100_N may be integrated into the pixel circuit 1620 (e.g., see FIG. 1), and the current source 200*a* may be integrated into the pixel driving circuit 1610. In an example embodiment, the plurality of channel driving circuits 100_1, 100_2, . . . , and 100_N and the current source 200*a* may be integrated into the pixel circuit 1620.

The plurality of channel driving circuits 100_1, 100_2, . . . , and 100_N may share a current source 200*b*. The current source 200*b* may include a digital-to-analog converter DAC for generating reference current according to a current control signal PAM. The reference current may be provided as the input current $I_{IN}$ to the N channel driving circuits 100_1, 100_2, . . . , and 100_N in a time-division manner.

Referring to FIG. 9, the plurality of channel driving circuits 100_1, 100_2, . . . , and 100_N may sequentially receive and sample the input current $I_{IN}$ from the current source 200*b*. The plurality of channel driving circuits 100_1, 100_2, . . . , and 100_N may receive the input current $I_{IN}$ from the digital-to-analog converter DAC for a first period allocated to each channel, and may sample the input current LN. For example, sampling control signals $CKS_1$, $CKS_2$, and $CKS_N$ may be respectively provided to the plurality of driving circuits 100_1, 100_2, . . . , and 100_N, and the input current $I_{IN}$ may be sampled in the first period in which a corresponding sampling control signal has an active level. As shown in FIG. 9, the plurality of driving circuits 100_1, 100_2, . . . , and 100_N may sequentially sample the input current based on the sampling control signals $CKS_1$, $CKS_2$, . . . , and $CKS_N$.

In some example embodiments, the input current $I_{IN}$ may be controlled by the current control signal PAM, and the current control signal PAM may be changed in synchronization with the first period corresponding to each of the plurality of driving circuits 100_1, 100_2, . . . , and 100_N. In a second period after the first period, the plurality of driving circuits 100_1, 100_2, . . . , and 100_N may generate output currents $I_{OUT1}$, $I_{OUT2}$, . . . , and $I_{OUTN}$ in response to corresponding dimming control signals $PWM_1$, $PWM_2$, . . . , and $PWM_N$, to drive corresponding LED channels. In some example embodiments, a second period of one channel driver of the plurality of driving circuits 100_1, 100_2, . . . , and 100_N, that is, a dimming period, and a first period of another channel driver, that is, an input sampling period, may overlap each other.

As such, the LED driver 10*b* may include the plurality of channel driving circuits 100_1, 100_2, . . . , and 100_N and may drive a plurality of LED channels, and during a first period allocated to each channel driver, each channel driver may receive, from the current source 200*b*, the input current $I_{IN}$ having a current value set to control a luminance of a corresponding LED channel, based on the current control signal PAM. Next, during a second period, each channel driving circuit may generate output current based on a corresponding dimming control signal for the second period, and may drive the plurality of LED channels based on the output current. Because the current source 200*a* is shared by the plurality of channel driving circuits 100_1, 100_2, . . . , and 100_N, power consumption may be reduced, and mismatch and power consumption between the plurality of channel driving circuits 100_1, 100_2, . . . , and 100_N may be reduced.

Figure 10:
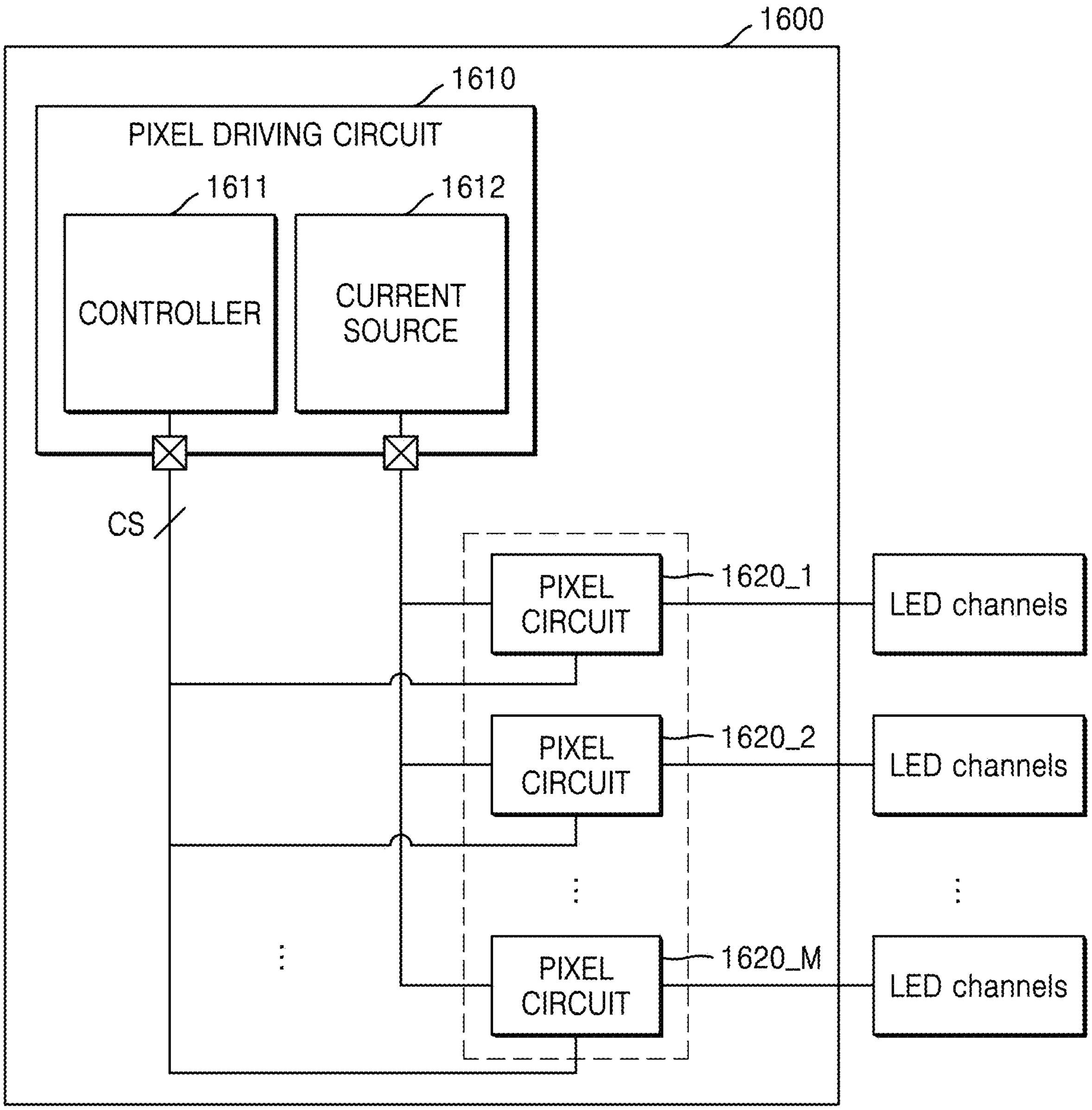
FIG. 10 is a block diagram illustrating a backlight driver, according to an example embodiment.

FIG. 10 is a block diagram illustrating a backlight driver, according to an example embodiment. In detail, FIG. 10 is a diagram illustrating the backlight driver 1600 of FIG. 1.

Referring to FIG. 10, the backlight driver 1600 may include the pixel driving circuit 1610 for providing power and pixel circuits 1620_1, 1620_2, . . . , and 1620_M (where M is a positive integer equal to or greater than 2) for driving a plurality of LED channels of the backlight unit 1500 (see FIG. 1) based on the provided power.

One of the LED drivers 10, 10*a*, and 10*b* described with reference to FIGS. 3, 6, and 7 or the channel driving circuit 100 described with reference to FIGS. 3, 6, and 7 may be applied to the pixel circuits 1620_1, 1620_2, . . . , and 1620_M. Each of the pixel circuits 1620_1, 1620_2, . . . , and 1620_M may drive LED channels included in at least one of a plurality of dimming groups of the backlight unit 1500 or may drive some of LED channels included in any one dimming group. That is, each of the pixel circuits 1620_1, 1620_2, . . . , and 1620_M may correspond to at least some of a plurality of areas of the display panel 1400. The numbers of LED channels driven by the pixel circuits 1620_1, 1620_2, . . . , and 1620_M may be the same or different from each other.

The pixel driving circuit 1610 and the pixel circuits 1620_1, 1620_2, . . . , and 1620_M may repeatedly perform an operation of storing current for driving LED channels, an operation of storing luminance data LDT corresponding to brightness of LED channels to be driven, and an operation of driving LED channels, for each frame period that is a time allocated to each frame.

The pixel driving circuit 1610 may include a controller 1611 and a current source 1612. The controller 1611 may provide a control signal CS to each of the pixel circuits 1620_1, 1620_2, . . . , and 1620_M. For example, the control signals CS may be CKS signals and PWM signals for controlling on/off of the switches SW1 through SW9 provided in a pixel circuit. Also, the current source 1612 may generate reference current, and may provide the reference current as input current to the pixel circuits 1620_1, 1620_2, . . . , and 1620_M in a time division manner. In an example embodiment, the current source 1612 may be implemented as the current source 200*a* described with reference to FIGS. 7 and 8, for example, a variable current source. However, the inventive concepts are not limited thereto, and the current source 1612 may be implemented as a constant current source.

Because the current source 1612 is connected in parallel to the pixel circuits 1620_1, 1620_2, . . . , and 1620_M through a common line, the reference current generated by the current source 1612 may be provided in parallel to the pixel circuits 1620_1, 1620_2, . . . , and 1620_M. In other words, the pixel circuits 1620_1, 1620_2, . . . , and 1620_M may share the current source 1612. The pixel circuits 1620_1, 1620_2, . . . , and 1620_M may sample the provided input current.

Because the pixel driving circuit 1610 is connected in parallel to the pixel circuits 1620_1, 1620_2, . . . , and 1620_M, when the pixel circuits 1620_1, 1620_2, . . . , and 1620_M are to simultaneously or substantially simultaneously sample current, the amount of current reaching each of the pixel circuits 1620_1, 1620_2, . . . , and 1620_M may be reduced to 1/M and thus, the amount of sampled current may not be sufficient. Accordingly, the controller 1611 may control execution times of current write operations of the pixel circuits 1620_1, 1620_2, . . . , and 1620_M to be different from each other. For example, the controller 1611 may generate a control signal CS, for example, a CKS signal, so that an execution time of a current write operation of the second pixel circuit 1620_2 is located after an execution time (e.g., a sampling period) of a current write operation of the first pixel circuit 1620_1.

The pixel circuits 1620_1, 1620_2, . . . , and 1620_M may perform a current write operation of sampling reference current in a first period (e.g., a sampling period) of a frame period. The pixel circuits 1620_1, 1620_2, . . . , and 1620_M may drive an LED channel by outputting output current for a period according to a PWM signal corresponding to a second period (e.g., a dimming period) of the frame period.

As such, because the backlight driver 1600 includes the pixel circuits 1620_1, 1620_2, . . . , and 1620_M configured to share the current source 1612 and one pixel circuit may drive a plurality of LED channels, the number of components provided in the backlight driver 1600 may be reduced, a size of the backlight driver 1600 may be reduced, and manufacturing costs may be reduced.

Figure 11:
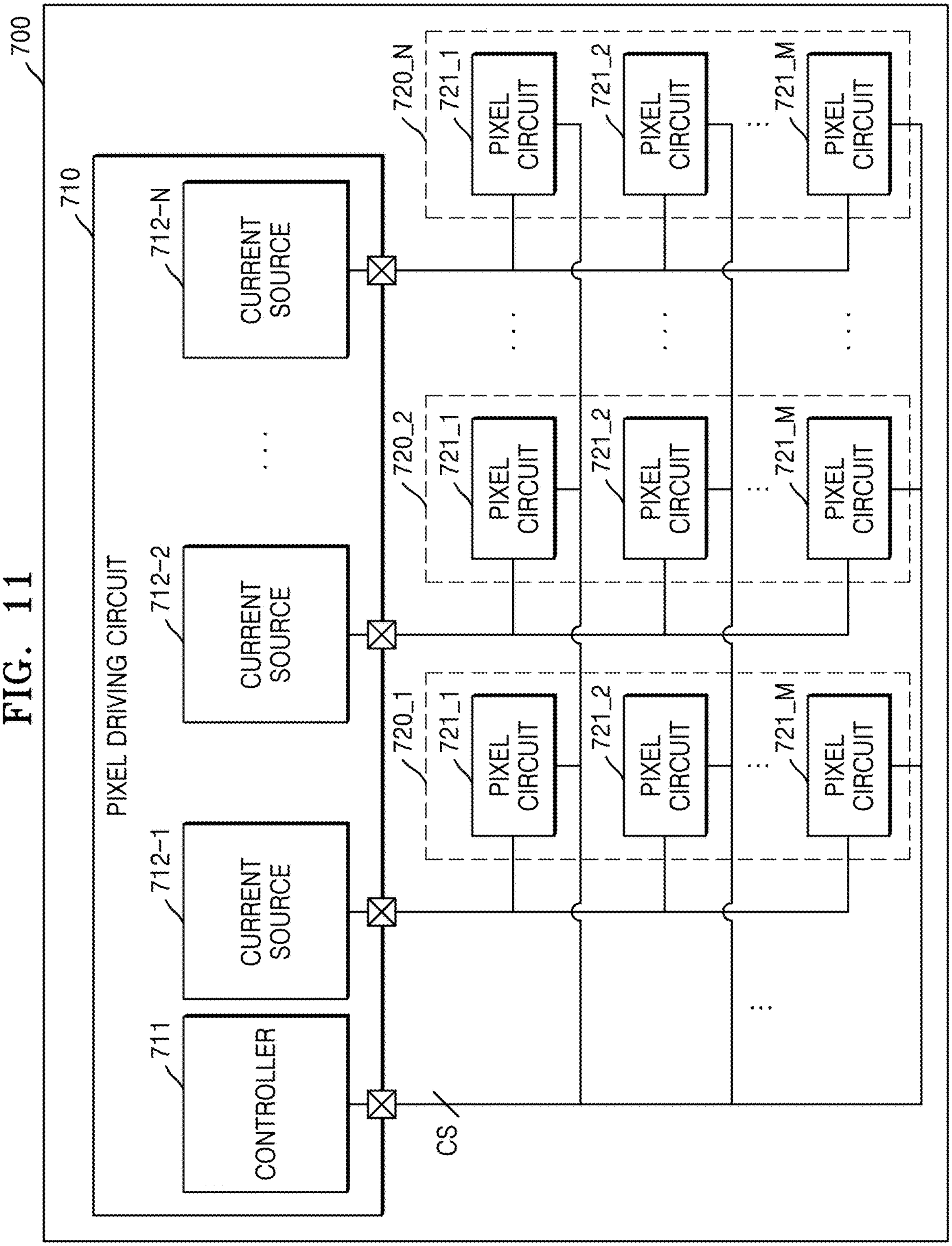
FIG. 11 is a block diagram illustrating a backlight driver, according to an example embodiment.

FIG. 11 is a block diagram illustrating a backlight driver, according to an example embodiment. In detail, FIG. 11 is a block diagram illustrating a modified example of the backlight driver 1600 of FIG. 10. The same description of a backlight driver 700 of FIG. 11 as that made for the backlight driver 1600 of FIG. 10 will be omitted.

Referring to FIG. 11, the backlight driver 700 may include a pixel driving circuit 710 and a plurality of pixel circuit groups, e.g., first through $N^{th}$ pixel circuit groups 720_1, 720_2, . . . , and 720_N. Pixel circuits 721_1, 721_2, . . . , and 721_ may include M pixel circuits (e.g., where M is a positive integer equal to or greater than 2), and the pixel circuits 721_1, 721_2, . . . , and 721_M may drive at least one LED channel of the backlight unit 1500 (e.g., see FIG. 1). The numbers of LED channels driven by the pixel circuits 721_1, 721_2, . . . , and 721_M may be the same or different from each other. One of the LED drivers 10, 10*a*, and 10*b* described with reference to FIGS. 3, 6, and 7 or the channel driving circuit 100 described with reference to FIGS. 3, 6, and 7 may be applied to the pixel circuits 721_1, 721_2, . . . , and 721_M.

The pixel driving circuit 710 may include a plurality of current sources, e.g., first through $N^{th}$ current sources 712_1, 712_2, . . . , and 712_N, corresponding to the pixel circuits 721_1, 721_2, . . . , and 721_M. For example, the first current source 712_1 may provide reference current to the first pixel circuit group 720_1, the second current source 712_2 may provide reference current to the second pixel circuit group 720_2, and the $N^{th}$ current source 712_N may provide reference current to the $N^{th}$ pixel circuit group 720_N. In an example embodiment, the current source 200*a* described with reference to FIGS. 7 and 8, for example, a variable current source, may be applied to the first through $N^{th}$ current sources 712_1, 712_2, . . . , and 712_N. However, the inventive concepts are not limited thereto, and a constant current source for generating constant current may be applied to the first through $N^{th}$ current sources 712_1, 712_2, . . . , and 712_N.

The pixel driving circuit 710 may include a controller 711. The controller 711 may respectively provide control signals to the first through $N^{th}$ pixel circuit groups 720_1, 720_2, . . . , and 720_N. In an example embodiment, sampling periods of pixel circuits arranged in the same column may be the same or substantially the same. Accordingly, the controller 711 may provide the same CKS signal to pixel circuits arranged in the same column (e.g., pixel circuit <1,1>, pixel circuit <1,2>, . . . , and pixel circuit <1,M>). The controller 711 may provide a PWM signal corresponding to each of pixel circuits. Each of pixel circuits provided in each of the first through $N^{th}$ pixel circuit groups 720_1, 720_2, . . . , and 720_N may sample reference current for an allocated time, based on a corresponding control signal, and may output an output current generated based on the reference current in response to a corresponding PWM signal.

Figure 12:
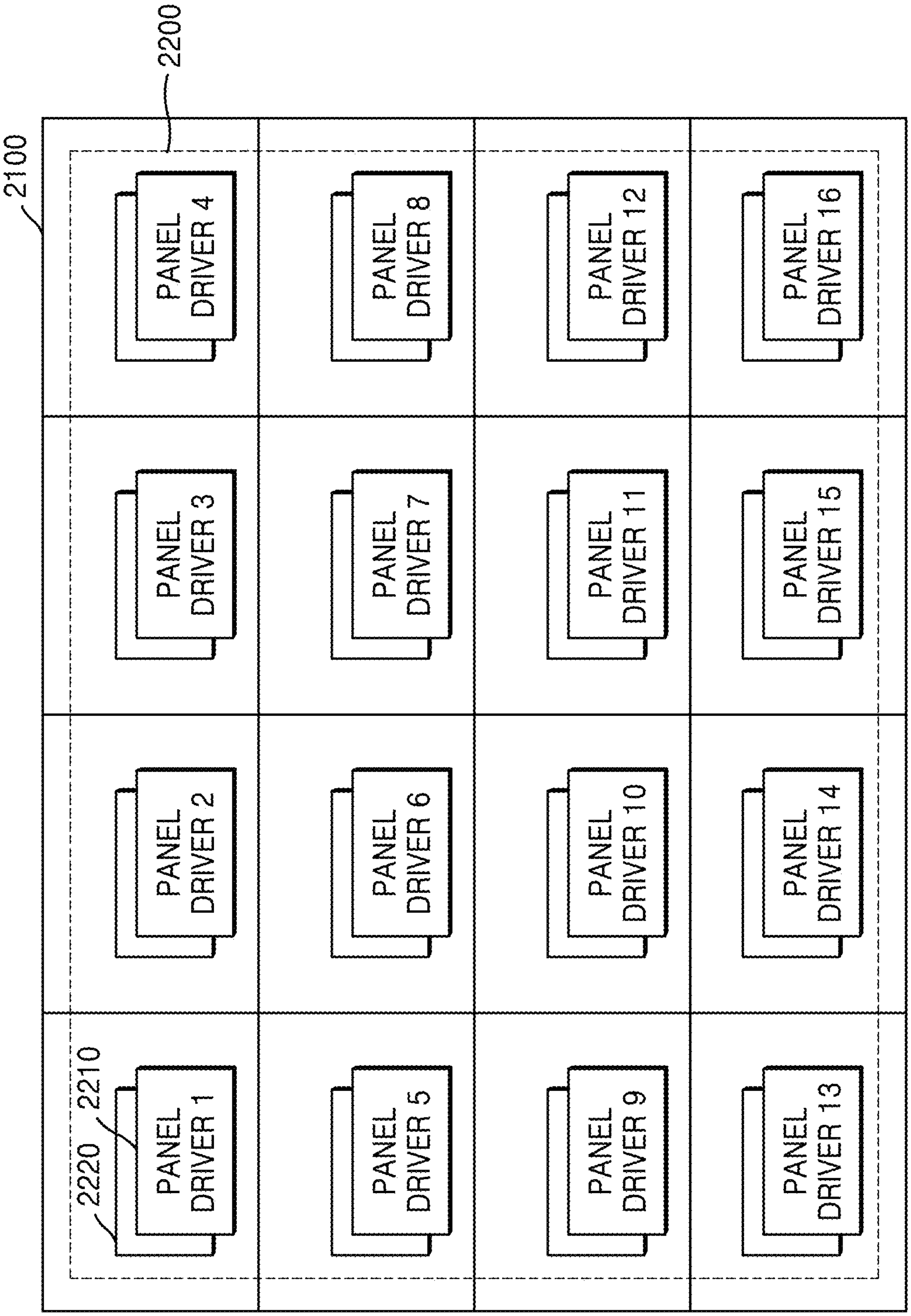
FIG. 12 illustrates a backlight device, according to an example embodiment.

FIG. 12 illustrates a backlight device, according to an example embodiment.

A backlight device 2000 may include a backlight unit 2100 and a backlight driver 2200. The backlight unit 2100 may be divided into a plurality of dimming groups, and the backlight driver 2200 may drive the backlight unit 2100 for each of the plurality of dimming groups.

In some example embodiments, the backlight driver 2000 may include a plurality of panel drivers 2210 and a plurality of pixel circuit groups 2220, in order to drive the backlight unit 2100 for each of the plurality of dimming groups. The panel driver 2210 and the pixel circuit group 2220 may respectively correspond to the pixel driving circuit 710 and one of the pixel circuit groups, e.g., first through $N^{th}$ pixel circuit groups 720_1, 720_2, . . . , and 720_N of FIG. 11.

The number of panel drivers 2210 and the number of pixel circuit groups 2220 included in the backlight unit 2100 may be the same or substantially the same. The plurality of panel drivers 2210 and the plurality of pixel circuit groups 2220 may respectively correspond to the plurality of dimming groups, and may drive LED channels of corresponding dimming groups. Each of the plurality of panel drivers 2210 and the plurality of pixel circuit groups 2220 may be arranged adjacent to an area where LED channels of a corresponding dimming group are located.

For example, when the backlight unit 2100 is divided into dimming groups arranged in a 4×4 array, the backlight driver 2200 may include 16 panel drivers 2210 and 16 pixel circuit groups 2220. Each of the 16 panel drivers 2210 and the 16 pixel circuit groups 2220 may be located adjacent to an area where a corresponding dimming group among the 16 dimming groups is located.

Figure 13:
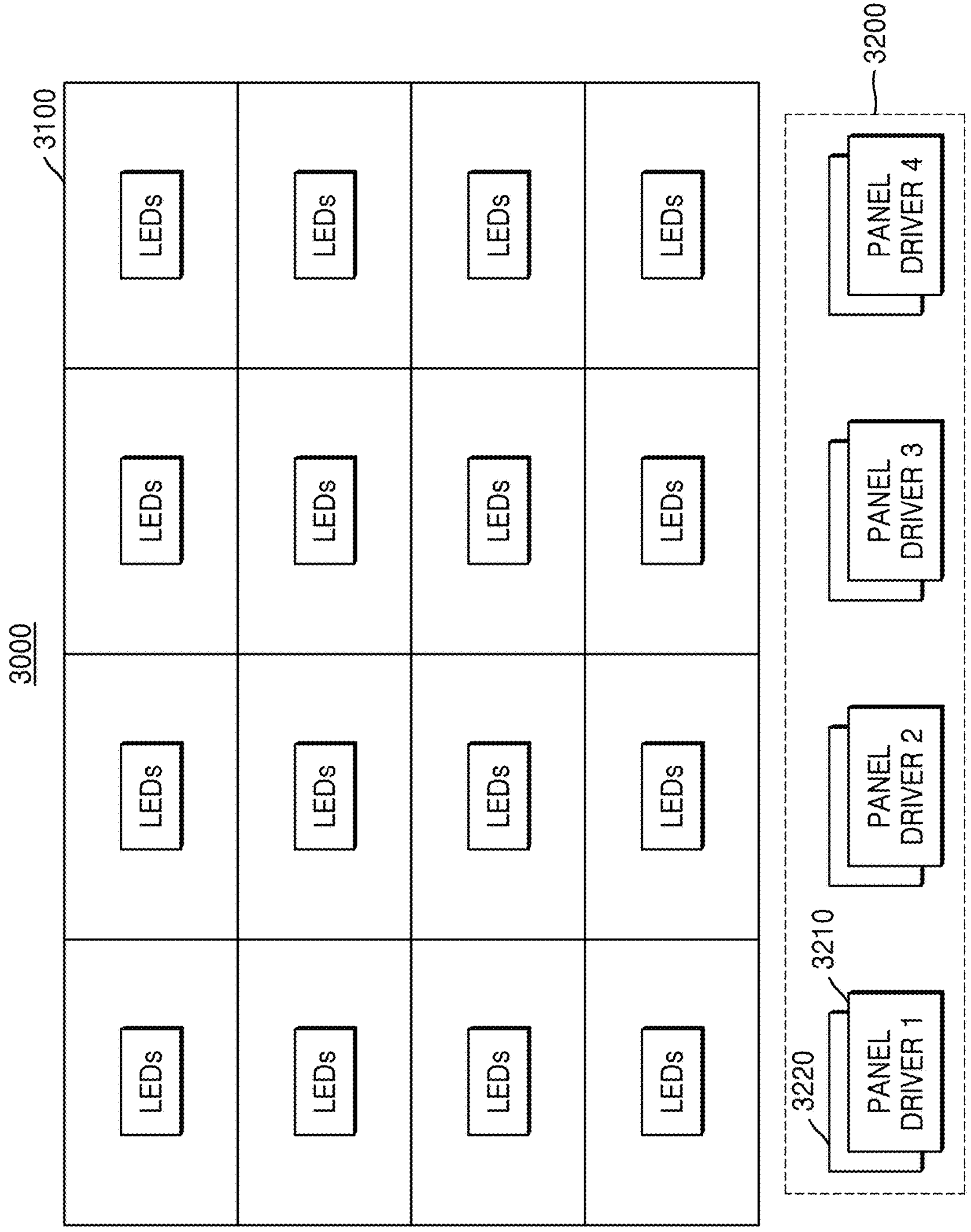
FIG. 13 is a diagram illustrating a backlight device, according to an example embodiment.

FIG. 13 is a diagram illustrating a backlight device, according to an example embodiment. In detail, FIG. 13 is a diagram illustrating a modified example of FIG. 12.

A backlight device 3000 may include a backlight unit 3100 and a backlight driver 3200. The backlight driver 3200 may drive a plurality of dimming groups of the backlight unit 3100 for each column (or each row). For example, the backlight driver 3200 may include a plurality of panel drivers 3210 and a plurality of pixel circuit groups 3220 corresponding to columns of the plurality of dimming groups of the backlight unit 3100. In some example embodiments, the backlight driver 3200 may be located in a non-display portion of the backlight unit 3100, and may drive LED channels through lines connected to the LED channels of the backlight unit 3100. The panel driver 3210 and the pixel circuit group 3220 may respectively correspond to the pixel driving circuit 7200 and one of the pixel circuit groups, e.g., first through $N^{th}$ pixel circuit groups 720_1, 720_2, . . . , and 720_N of FIG. 11

For example, referring to FIG. 13, when the backlight unit 3100 is divided into dimming groups arranged in a 4×4 array and the dimming groups are divided into four columns, the backlight driver 3200 may include four panel drivers 3210 and four pixel circuit groups 3220 corresponding to the number of columns. Each of the four panel drivers 3210 and the four pixel circuit groups 3220 may be located in a non-display portion adjacent to a corresponding column among the four columns.

Although the backlight driver 3200 includes a plurality of panel drivers 3210 and a plurality of pixel circuit groups 3220 corresponding to columns of a plurality of dimming groups of the backlight unit 3100 in FIG. 13, the inventive concepts are not limited thereto. For example, the backlight driver 3200 may include a plurality of panel drivers 3210 and a plurality of pixel circuit groups 3220 corresponding to rows, o drive a plurality of dimming groups of the backlight unit 3100 for each row.

Figure 14:
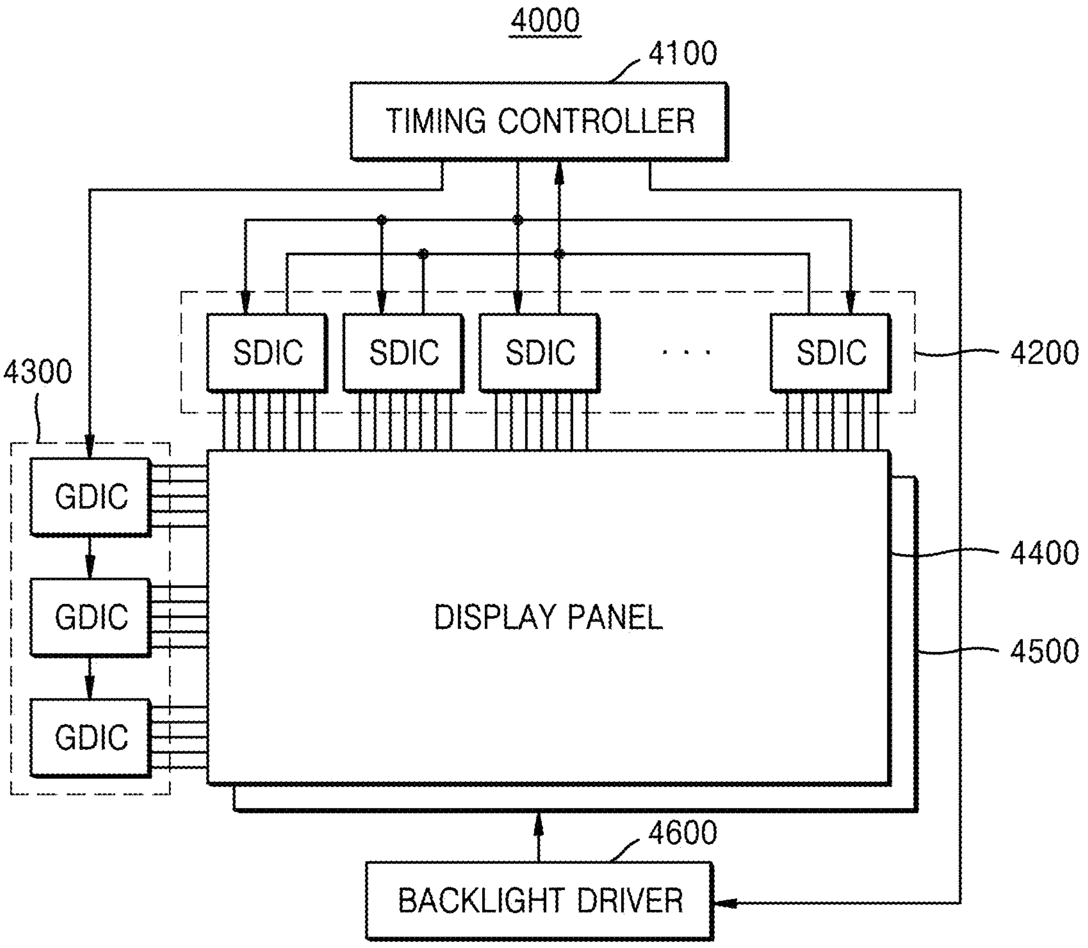
FIG. 14 illustrates a display apparatus, according to an example embodiment.

FIG. 14 illustrates a display apparatus, according to an example embodiment.

A display apparatus 4000 of FIG. 14 that is an apparatus including a medium or large display panel 4400 may be applied to, for example, a television, a monitor, etc.

Referring to FIG. 14, the display apparatus 4000 may include a timing controller 4100, a source driver 4200, a gate driver 4300, the display panel 4400, a backlight unit 4500, and a backlight driver 4600.

The timing controller 4100 may include one or more integrated circuits or modules. The timing controller 4100 may communicate with a plurality of source driver integrated circuits (ICs) (SDICs) and a plurality of gate driver ICs (GDICs) through a set interface.

The timing controller 4100 may generate control signals for controlling driving timings of the plurality of SDICs and the plurality of GDICs, and may provide the control signals to the plurality of SDICs and the plurality of GDICs.

The source driver 4200 may include the plurality of SDICs, and the plurality of SDICs may be mounted on a circuit film such as a tape carrier package (TCP), a chip-on-film (COF), or a flexible print circuit (FPC) and attached to the display panel 4400 by using a tape automatic bonding (TAB) method, or may be mounted in a non-display area of the display panel 4400 by using a chip-on-glass (COG) method.

The gate driver 4300 may include the plurality of GDICs, and the plurality of GDICs may be mounted on a circuit film and attached to the display panel 4400 by using a TAB method, or may be mounted in a non-display area of the display panel 4400 by using a COG method. Alternatively, the gate driver 4300 may be directly formed on a lower substrate of the display panel 4400 by using a gate-driver in panel (GIP) method. The gate driver 4300 may be formed in a non-display area outside a pixel array where pixels are formed on the display panel 4400, and may be formed by using the same TFT process as that of the pixels.

The backlight driver 4600 may be implemented as any of the backlight drivers 1600 and 700 described with reference to FIGS. 1, 10, and 11, and may include one of the LED drivers 10, 10*a*, and 10*b* described with reference to FIGS. 1 to 9. The accuracy of output current of the backlight driver 4600 may be improved and current consumption may be reduced.

Figure 15:
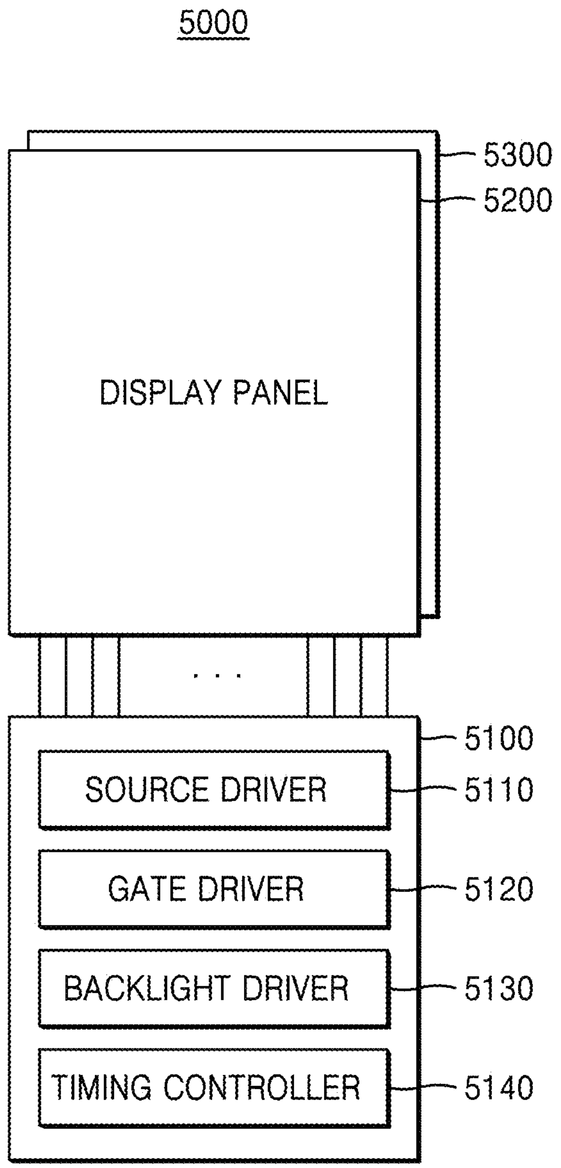
FIG. 15 illustrates a display apparatus, according to an example embodiment.

FIG. 15 illustrates a display apparatus, according to an example embodiment. A display apparatus 5000 of FIG. 15 that is an apparatus including a small display panel 5200 may be applied to, for example, a mobile device such as a smartphone or a tablet PC, or a wearable device.

Referring to FIG. 15, the display apparatus 5000 may include a display driving circuit 5100, the display panel 5200, and a backlight unit 5300. The display driving circuit 5100 may include one or more ICs, and may be mounted on a circuit film such as a tape carrier package (TCP), a chip-on-film (COF), or a flexible print circuit (FPC) and attached to the display panel 5200 by using a tape automatic bonding (TAB) method, or may be mounted in a non-display area (e.g., an area where an image is not displayed) of the display panel 5200 by using a chip-on-glass (COG) method.

The display driving circuit 5100 may include a source driver 5110, a gate driver 5120, a backlight driver 5130, and a timing controller 5140. The backlight driver 5130 may be implemented as any of the backlight drivers 1600 and 700 described with reference to FIGS. 1, 10, and 11, and may include one of the LED drivers 10, 10*a*, and 10*b* described with reference to FIGS. 1 to 9. The accuracy of output current of the backlight driver 5130 may be improved and current consumption may be reduced.

It will be understood that elements and/or properties thereof described herein as being "substantially" the same and/or identical encompasses elements and/or properties thereof that have a relative difference in magnitude that is equal to or less than 10%. Further, regardless of whether elements and/or properties thereof are modified as "substantially," it will be understood that these elements and/or properties thereof should be construed as including a manufacturing or operational tolerance (e.g., ±10%) around the stated elements and/or properties thereof.

One or more of the elements disclosed above may include or be implemented in one or more processing circuitries such as hardware including logic circuits; a hardware/software combination such as a processor executing software; or a combination thereof. For example, the processing circuitries more specifically may include, but is not limited to, a central processing unit (CPU), an arithmetic logic unit (ALU), a digital signal processor, a microcomputer, a field programmable gate array (FGPA), a System-on-Chip (SoC), a programmable logic unit, a microprocessor, application-specific integrated circuit (ASIC), etc.

While some example embodiments of the inventive concept have been particularly shown and described with reference to embodiments thereof, it will be understood that various changes in form and details may be made therein without departing from the scope of the example embodiments.

What is claimed is:

1. A light-emitting diode (LED) driving circuit for driving an LED channel comprising a plurality of LED elements, the LED driving circuit comprising:

a switch-capacitor amplifier circuit configured to sample received input current and amplify an input voltage corresponding to the input current;

a replica circuit configured to connect to the switch-capacitor amplifier circuit in a first period to define a first feedback loop, the replica circuit including a first transistor and a first resistor connected to the first transitor, and the first transistor configured to generate a current based on an output voltage of the switch-capacitor amplifier circuit in the first period; and an output circuit configured to connect to the switch-capacitor amplifier circuit in a second period to define a second feedback loop, the second period being after the first period, the output circuit including a second transistor and a second resistor connected to the second transistor, and the output circuit configured to generate output current according to the output voltage of the switch-capacitor amplifier circuit in the second period and provide the output current to the LED channel.

2. The LED driving circuit of claim 1, wherein the switch-capacitor amplifier circuit comprises:

an amplifier comprising a first input end and a second input end;

a first capacitor having an end connected to the first input end of the amplifier, the first capacitor configured to store the input voltage; and a second capacitor having a first end connected to the second input end of the amplifier.

3. The LED driving circuit of claim 2, wherein a capacitance of the first capacitor and a capacitance of the second capacitor are identical.

4. The LED driving circuit of claim 3, wherein the switch-capacitor amplifier circuit and the replica circuit are configured to connect to each other in the first period, and the second capacitor is configured to store an offset voltage according to an offset of the amplifier.

5. The LED driving circuit of claim 2, wherein the switch-capacitor amplifier circuit further comprises:

a third resistor configured to conduct the input current in the first period;

a first switch configured to connect an end of the third resistor to the end of the first capacitor in the first period;

a second switch configured to connect the end of the third resistor to a second end of the second capacitor in the first period;

a third switch configured to connect the first end of the second capacitor to the replica circuit in the first period; and a fourth switch configured to connect the second end of the second capacitor to the output circuit in the second period.

6. The LED driving circuit of claim 5, wherein the first switch, the second switch, and the third switch are configured to turn off in the second period, and a voltage change amount of the first input end due to leakage current of the first switch is same as a voltage change amount of the second input end due to leakage current of the second switch.

7. The LED driving circuit of claim 1, wherein, in the first period, the output circuit is configured to be in an off state, and in the second period, the replica circuit is configured to be in an off state, and the output circuit is configured to generate the output current in response to a dimming control signal.

8. The LED driving circuit of claim 1, further comprising a digital-to-analog converter configured to generate a reference current, provide the reference current as the input current to the switch-capacitor amplifier circuit, and vary the reference current according to input data.

9. A light-emitting diode (LED) driving circuit for driving a backlight unit comprising a plurality of LED channels, the LED driving circuit comprising:

a current source configured to generate a reference current; and a plurality of channel driving circuits configured to sequentially sample the reference current received from the current source, and generate output current, wherein each of the plurality of channel driving circuits comprises a switch-capacitor amplifier circuit configured to sample the reference current and amplify an input voltage corresponding to an input current, the switch-capacitor amplifier circuit including, an amplifier including a first input end and a second input end, a first capacitor having an end connected to the first input end of the amplifier, the first capacitor configured to store the input voltage, and a second capacitor having a first end connected to the second input end of the amplifier, an output circuit configured to generate output current according to an output voltage of the switch-capacitor amplifier circuit in response to a dimming control signal, and provide the output current to LED elements, and a replica circuit connected to the switch-capacitor amplifier circuit to define a feedback loop when the output circuit is in an off state.

10. The LED driving circuit of claim 9, wherein the current source comprises a digital-to-analog converter configured to generate the reference current based on input data corresponding to each of the plurality of channel driving circuits, and the reference current has a current value corresponding to each of the plurality of channel driving circuits.

11. The LED driving circuit of claim 9, wherein, in a first period, the replica circuit is configured to connect to the switch-capacitor amplifier circuit to sample the input current, and the output circuit is configured to turn off; and in a second period consecutive to the first period, the output circuit is configured to connect to the switch-capacitor amplifier circuit to generate output current based on the output voltage, and the replica circuit is configured to turn off.

12. The LED driving circuit of claim 9, wherein a period in which a first one of the plurality of channel driving circuits generates the output current, and a period in which a second one of the plurality of channel driving circuits samples the reference current, overlap each other.

13. The LED driving circuit of claim 9, wherein the switch-capacitor amplifier circuit comprises:

an input resistor having an end configured to receive the reference current;

a first switch configured to turn on to connect the end of the input resistor to the end of the first capacitor; and a second switch configured to turn on to connect the end of the input resistor to a second end of the second capacitor.

14. A backlight device comprising:

a backlight unit (BLU) comprising a plurality of dimming groups;

a plurality of pixel circuits each configured to drive a corresponding one of the plurality of dimming groups, each of the plurality of pixel circuits comprising a plurality of channel driving circuits configured to provide a plurality of output currents to a plurality of light-emitting diode (LED) channels included in the corresponding one of the plurality of dimming groups; and a pixel driving circuit configured to provide a reference current to the plurality of pixel circuits, wherein each of the plurality of channel driving circuits comprises a switch-capacitor amplifier circuit configured to sample the reference current in a first period, a replica circuit configured to define a feedback loop with the switch-capacitor amplifier circuit in the first period, the replica circuit including a transistor and a resistor connected to the transistor, the transistor configured to operate based on an output of the switch-capacitor amplifier circuit in the first period, and an output circuit including a driving transistor and an output resistor connected to the driving transistor, the driving transistor configured to generate at least one of the plurality of output currents according to an output voltage of the switch-capacitor amplifier circuit in a second period consecutive to the first period, and the output resistor configured to receive the at least one of the plurality of output currents.

15. The backlight device of claim 14, wherein the switch-capacitor amplifier circuit comprises:

an amplifier comprising a first input end and a second input end;

a first capacitor having an end connected to the first input end of the amplifier;

a second capacitor having a first end connected to the second input end of the amplifier;

an input resistor comprising an end configured to receive the reference current;

a first switch configured to turn on to connect the end of the input resistor to the end of the first capacitor;

a second switch configured to turn on to connect the end of the input resistor to a second end of the second capacitor; and a third switch configured to turn on to connect the first end of the second capacitor to the replica circuit.

16. The backlight device of claim 15, wherein, in the first period, the replica circuit is configured to connect to the first end of the second capacitor to store an offset voltage of the switch-capacitor amplifier circuit, and in the second period, the output circuit is configured to connect to the second end of the second capacitor to compensate for the offset voltage of the switch-capacitor amplifier circuit, based on the offset voltage stored in the second capacitor.

17. The backlight device of claim 15, wherein the pixel driving circuit is further configured to generate reference current corresponding to each of the plurality of channel driving circuits based on a current control signal that varies in response to each of the plurality of channel driving circuits of each of the plurality of pixel circuits.

18. The backlight device of claim 14, wherein the plurality of channel driving circuits are configured to sequentially sample the reference current, and generate the plurality of output currents based on a sampled signal.

* * * * *